United States Patent
Tagliabue

(10) Patent No.: US 8,918,780 B2
(45) Date of Patent: Dec. 23, 2014

(54) AUTOMATIC QUALITY ASSURANCE FOR SOFTWARE INSTALLERS

(71) Applicant: International Business Machines Corporation, Armonk, NY (US)

(72) Inventor: Leonardo Tagliabue, Buenos Aires (AR)

(73) Assignee: International Business Machines Corporation, Armonk, NY (US)

(*) Notice: Subject to any disclaimer, the term of this patent is extended or adjusted under 35 U.S.C. 154(b) by 97 days.

(21) Appl. No.: 13/826,961

(22) Filed: Mar. 14, 2013

(65) Prior Publication Data

US 2014/0282488 A1 Sep. 18, 2014

(51) Int. Cl.
*G06F 3/12* (2006.01)
*G06F 9/445* (2006.01)
*G06F 17/21* (2006.01)

(52) U.S. Cl.
CPC ............... *G06F 8/61* (2013.01); *G06F 3/1225* (2013.01); *G06F 3/1285* (2013.01); *G06F 17/211* (2013.01); *G06F 3/1204* (2013.01)
USPC .......................................... 717/174; 717/121

(58) Field of Classification Search
None
See application file for complete search history.

(56) References Cited

U.S. PATENT DOCUMENTS

| | | | |
|---|---|---|---|
| 6,347,397 B1 * | 2/2002 | Curtis ............................ | 717/170 |
| 6,560,776 B1 | 5/2003 | Breggin et al. | |
| 6,738,970 B1 | 5/2004 | Kruger et al. | |
| 7,194,728 B1 | 3/2007 | Sirota et al. | |
| 7,624,394 B1 | 11/2009 | Christopher, Jr. | |
| 7,743,373 B2 | 6/2010 | Avram et al. | |
| 8,136,100 B1 * | 3/2012 | Goldman ....................... | 717/136 |
| 2003/0051235 A1 | 3/2003 | Simpson | |
| 2003/0226138 A1 * | 12/2003 | Luu ............................... | 717/175 |
| 2007/0220032 A1 * | 9/2007 | Kapoor et al. ................ | 707/102 |
| 2008/0127169 A1 * | 5/2008 | Malasky et al. ............... | 717/174 |
| 2011/0113413 A1 * | 5/2011 | Ewington et al. ............. | 717/168 |
| 2012/0137281 A1 * | 5/2012 | Kleiner et al. ................ | 717/174 |
| 2014/0040873 A1 * | 2/2014 | Goldman ....................... | 717/168 |

OTHER PUBLICATIONS

Installation and Un-Installation of a Software Test Cases; [online] Jul. 2, 2012; 10 pages; Retrieved from the Internet: <URL: http://www.qualitytesting.info/forum/topics/installation-and>.

* cited by examiner

*Primary Examiner* — Isaac T Tecklu
*Assistant Examiner* — Reshaun M Finkley
(74) *Attorney, Agent, or Firm* — Schmeiser, Olsen & Watts; John Pivnichny

(57) ABSTRACT

An approach for assuring quality of a software installer is presented. A first view of a system is recorded. The installer is executed to create installed components for an application, and subsequently, a second view of the system is recorded. Based on a recorded change between the first and second views, information about the installed components is recorded. The installation is determined to be successful or unsuccessful. If successful, selected installed components are removed. The installer is executed to reinstall the selected installed components. The reinstallation is verified. A third view of the system is recorded. An uninstaller is executed to uninstall the software application. A fourth view of the system is recorded. The uninstallation is verified. A report is generated using the first, second, third and fourth views.

17 Claims, 10 Drawing Sheets

AUTOMATIC QUALITY ASSURANCE FOR SOFTWARE INSTALLERS

TECHNICAL FIELD

The present invention relates to a data processing method and system for assuring quality of software, and more particularly to a technique for automatically assuring quality of software installers.

BACKGROUND

An End User Services (EUS) Application Packaging service generates software installers (also known as (a.k.a.) "installation packages" or "packages"), based on customer requirements. Certain software applications, such as an Adobe® Reader® electronic document viewer, are configured and silently executed on customer's workstations to perform a transparent and unattended installation. The Adobe® Reader® electronic document viewer is offered by Adobe Systems, Inc. located in San Jose, Calif. In order to create installation packages, a standard and global "best practices" guide explains how to create a software installer using a standard set of tools. Different customers, however, demand different tools and methodologies when creating software installers. A quality assurance (QA) procedure for testing a software installer includes verifying that the software installer can provide successful installation, reinstallation and uninstallation of an application, and also includes several other checks. Log file generation and naming conventions, signed files or registry signed entries, and shortcut locations provide common verifications in the QA procedure. Packagers (i.e., people who create the software installers) manually perform the aforementioned verifications using a QA checklist as a guide. Because of the volume of packages being created, the packagers often do not use the QA checklist in the correct manner or the packagers do not have time to manually test each item, thereby leading to several required tests being omitted. The omitted tests lead to a package being delivered to a customer and failing, which results in the package being returned by the customer to be adjusted, thereby generating a significant number of rework incidents and a significant amount of time to modify the failures.

BRIEF SUMMARY

In a first embodiment, the present invention provides a method of managing a software installer. The method includes a computer recording information representative of a first view of an operating system of the computer. The method further includes the computer executing the software installer to create installed components in an installation of a software application. The method further includes subsequent to the step of executing the software installer to create the installed components in the installation, the computer recording information representative of a second view of the operating system. The method further includes the computer determining and recording a change between the first view and the second view. The method further includes based on the change, the computer recording information about the installed components. The method further includes the computer performing checks on the installation. The method further includes based on the checks on the installation, the computer determining whether the installation was successful. The method further includes responsive to a determination that the installation was successful, the computer removing selected installed components. The method further includes the computer executing the software installer to perform a reinstallation of the selected installed components that had been removed. The method further includes the computer performing checks on the reinstallation. The method further includes subsequent to the step of executing the software installer to perform the reinstallation, the computer recording information representative of a third view of the operating system. The method further includes the computer executing an uninstaller to perform an uninstallation of the software application. The method further includes subsequent to the step of executing the uninstaller, the computer recording information representative of a fourth view of the operating system. The method further includes the computer performing checks on the uninstallation. The method further includes the computer generating a report using the recorded information representative of the first, second, third and fourth views of the operating system.

In a second embodiment, the present invention provides a central processing unit (CPU); a memory coupled to the CPU; and a computer-readable, tangible storage device coupled to the CPU. The storage device includes instructions that are executed by the CPU via the memory to implement a method of managing a software installer. The method includes the computer system recording information representative of a first view of an operating system of the computer system. The method further includes the computer system executing the software installer to create installed components in an installation of a software application. The method further includes subsequent to the step of executing the software installer to create the installed components in the installation, the computer system recording information representative of a second view of the operating system. The method further includes the computer system determining and recording a change between the first view and the second view. The method further includes based on the change, the computer system recording information about the installed components. The method further includes the computer system performing checks on the installation. The method further includes based on the checks on the installation, the computer system determining whether the installation was successful. The method further includes responsive to a determination that the installation was successful, the computer system removing selected installed components. The method further includes the computer system executing the software installer to perform a reinstallation of the selected installed components that had been removed. The method further includes the computer system performing checks on the reinstallation. The method further includes subsequent to the step of executing the software installer to perform the reinstallation, the computer system recording information representative of a third view of the operating system. The method further includes the computer system executing an uninstaller to perform an uninstallation of the software application. The method further includes subsequent to the step of executing the uninstaller, the computer system recording information representative of a fourth view of the operating system. The method further includes the computer system performing checks on the uninstallation. The method further includes the computer system generating a report using the recorded information representative of the first, second, third and fourth views of the operating system.

In a third embodiment, the present invention provides a computer program product including a computer-readable, tangible storage device and a computer-readable program code stored in the computer-readable, tangible storage device. The computer-readable program code includes instructions that are executed by a central processing unit (CPU) of a computer system to implement a method of managing a software installer. The method includes the computer system recording information representative of a first view of an operating system of the computer system. The method further includes the computer system executing the software installer to create installed components in an installation of a software application. The method further includes subsequent to the step of executing the software installer to create the installed components in the installation, the computer system recording information representative of a second view of the operating system. The method further includes the computer system determining and recording a change between the first view and the second view. The method further includes based on the change, the computer system recording information about the installed components. The method further includes the computer system performing checks on the installation. The method further includes based on the checks on the installation, the computer system determining whether the installation was successful. The method further includes responsive to a determination that the installation was successful, the computer system removing selected installed components. The method further includes the computer system executing the software installer to perform a reinstallation of the selected installed components that had been removed. The method further includes the computer system performing checks on the reinstallation. The method further includes subsequent to the step of executing the software installer to perform the reinstallation, the computer system recording information representative of a third view of the operating system. The method further includes the computer system executing an uninstaller to perform an uninstallation of the software application. The method further includes subsequent to the step of executing the uninstaller, the computer system recording information representative of a fourth view of the operating system. The method further includes the computer system performing checks on the uninstallation. The method further includes the computer system generating a report using the recorded information representative of the first, second, third and fourth views of the operating system.

In a fourth embodiment, the present invention provides a process for supporting computing infrastructure. The process includes a first computer system providing at least one support service for at least one of creating, integrating, hosting, maintaining, and deploying computer-readable code in a second computer system. The computer-readable code includes instructions, where the instructions, when executed by a processor of the second computer system, implement a method of managing a software installer. The method includes the second computer system recording information representative of a first view of an operating system of the second computer system. The method further includes the second computer system executing the software installer to create installed components in an installation of a software application. The method further includes subsequent to the step of executing the software installer to create the installed components in the installation, the second computer system recording information representative of a second view of the operating system. The method further includes the second computer system determining and recording a change between the first view and the second view. The method further includes based on the change, the second computer system recording information about the installed components. The method further includes the second computer system performing checks on the installation. The method further includes based on the checks on the installation, the second computer system determining whether the installation was successful. The method further includes responsive to a determination that the installation was successful, the second computer system removing selected installed components. The method further includes the second computer system executing the software installer to perform a reinstallation of the selected installed components that had been removed. The method further includes the second computer system performing checks on the reinstallation. The method further includes subsequent to the step of executing the software installer to perform the reinstallation, the second computer system recording information representative of a third view of the operating system. The method further includes the second computer system executing an uninstaller to perform an uninstallation of the software application. The method further includes subsequent to the step of executing the uninstaller, the second computer system recording information representative of a fourth view of the operating system. The method further includes the second computer system performing checks on the uninstallation. The method further includes the second computer system generating a report using the recorded information representative of the first, second, third and fourth views of the operating system.

Embodiments of the present invention provide an automated technique for verifying software installers, thereby reducing rework incidents, avoiding common human errors and forcing packagers to perform the correct verifications. Embodiments of the present invention generate detailed reports on the behavior of a software installer and verification tests performed on the software installer. The reports can be shared among teams involved in an application packaging tasks cycle. Packagers viewing the generated report learn from their errors because they view detected problems as the problems occur.

DETAILED DESCRIPTION

Overview

Embodiments of the present invention automatically perform quality assurance testing on features of software installers, including installation, reinstallation and uninstallation of a software application. Embodiments of the present invention take operating system snapshots (i.e., captures) before and after installation and before and after uninstallation to verify the installation and uninstallation, respectively. A selection of installed files resulting from the installation may be deleted to verify reinstallation. In one embodiment, a final quality assurance report is generated based on all information collected when verifying installation, reinstallation, and uninstallation. The final report may include the installed, modified and erased files resulting from the installation, reinstallation and uninstallation.

System for Assuring Quality of a Software Installer

Figure 1:
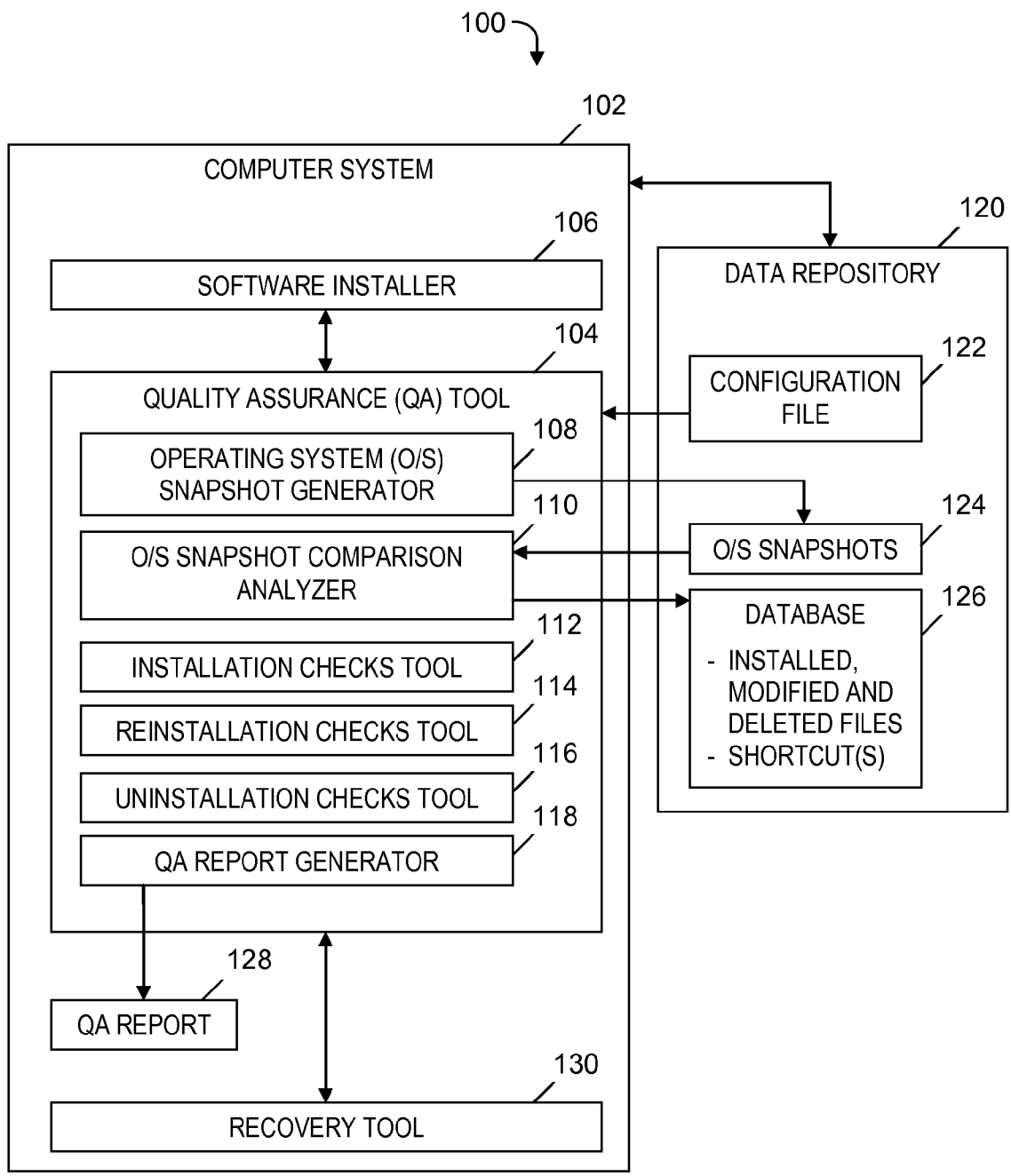
FIG. 1 is a block diagram of a system for assuring quality of a software installer, in accordance with embodiments of the present invention.
Figure 8:
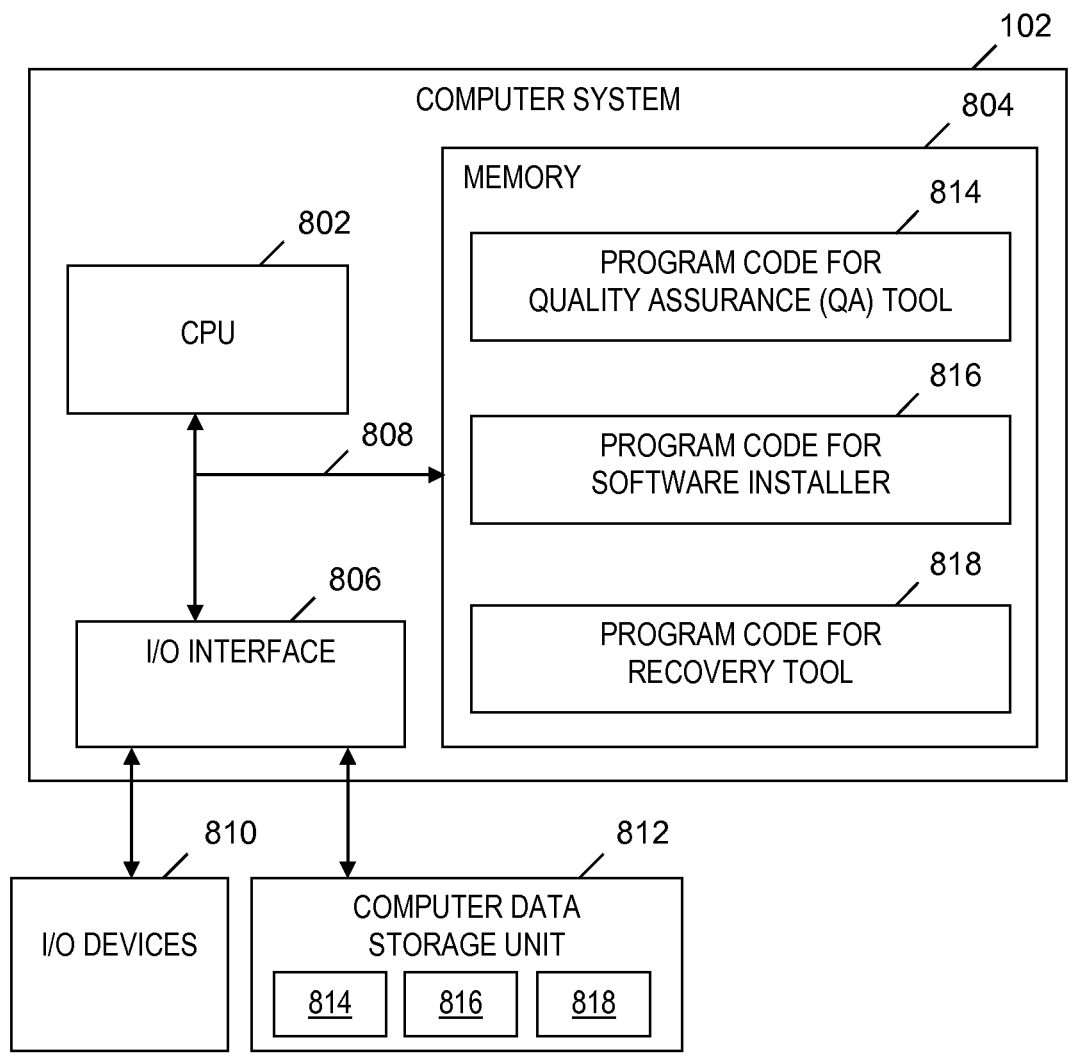
FIG. 8 is a block diagram of a computer system included in the system of FIG. 1 and that implements the processes of FIGS. 2A-2B, FIG. 3A, FIG. 3B, FIG. 4, FIG. 5, FIG. 6, and FIG. 7, in accordance with embodiments of the present invention.

FIG. 1 is a block diagram of a system for assuring quality of a software installer, in accordance with embodiments of the present invention. A system 100 includes a computer system 102, which runs a software-based quality assurance (QA) tool 104 and a software installer 106. QA tool 104 includes an operating system (O/S) snapshot generator, an O/S snapshot comparison analyzer 110, an installation checks tool 112, a reinstallation checks tool 114, an uninstallation checks tool 116, and a QA report generator 118. Computer system 102 includes other components which are shown in FIG. 8 and described in the discussion of FIG. 8, presented below.

System 100 also includes a data repository 120, which is operatively coupled to computer system 102. Data repository 120 includes a configuration file 122, O/S snapshots 124 and a database 126. QA tool 104 reads configuration file 122. O/S snapshot generator 108 generates O/S snapshots 124. O/S snapshot comparison analyzer 110 receives and compares O/S snapshots 124 taken before and after an installation of software installer 106 and before and after an uninstallation of software installer 106. From the comparisons, O/S snapshot comparison analyzer determines installed, modified and deleted files and shortcut(s) stores the files and shortcut(s) in database 126.

Installation checks tool 112 performs verification checks on an installation of a software application performed by software installer 106. Reinstallation checks tool 114 performs verification checks on a reinstallation of the software application by software installer 106. As used herein, a reinstallation includes reinstalling, not an entire software application, but only the files or other components that are required for a complete installation but are currently missing (e.g., files that had been previously deleted due to, for example, a deletion of shortcuts by a user or a deletion of files by malware). By reinstalling only the files or other components that are currently missing, a reinstallation avoids a need to uninstall an entire software application and then installing the entire software application again. Uninstallation checks tool 116 performs verification checks on an uninstallation of the software application by software installer 106 or by a software-based uninstaller (not shown) associated with software installer 106. Hereinafter, the software application whose installation is verified by installation checks tool 112, whose reinstallation is verified by reinstallation checks tool 114, and/or whose uninstallation is verified by uninstallation checks tool 116 is also referred to simply as "the software application."

QA report generator 118 generates a final QA report 128 based on information collected when verifying the installation, reinstallation, and uninstallation of the software application. In one embodiment, QA report 128 indicates files that are installed, files that are modified and/or files that are deleted as a result of the installation, reinstallation and uninstallation verifications.

Computer system 102 also runs a software-based recovery tool 130, which is invoked in response to determining that an installation fails. Recovery tool 130 attempts to fix a software installer based on information collected as a result of the installation verification.

The functionality of the components of FIG. 1 is described in more detail in the discussions presented below relative to FIGS. 2A-2B, FIG. 3A, FIG. 3B, FIG. 4, FIG. 5, FIG. 6, and FIG. 7, and in the section entitled Computer System.

Processes for Assuring Quality of an Installation by a Software Installer

Figure 2A:
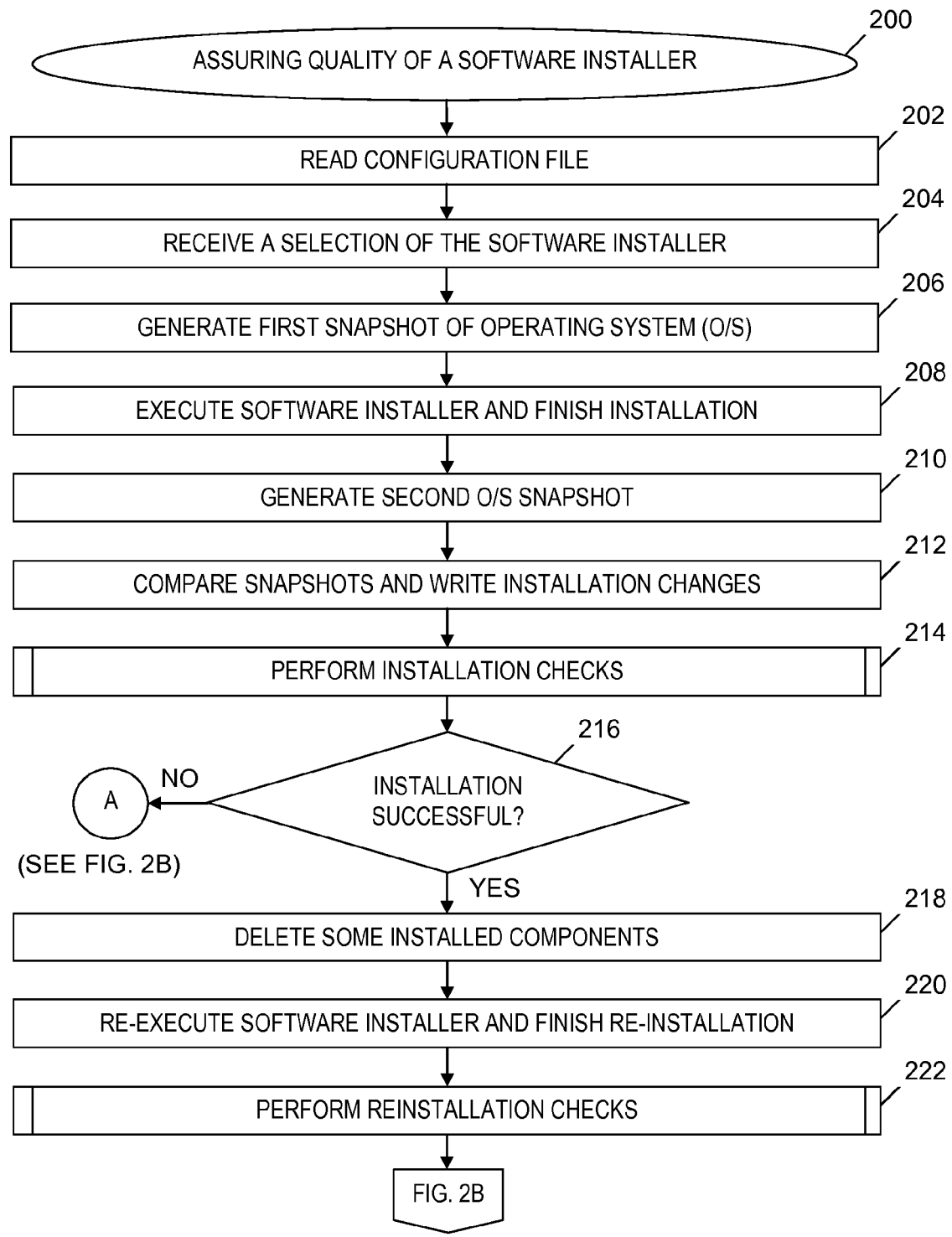
FIGS. 2A-2B depict a flowchart of a process of assuring quality of a software installer in the system of FIG. 1, in accordance with embodiments of the present invention.
Figure 2B:
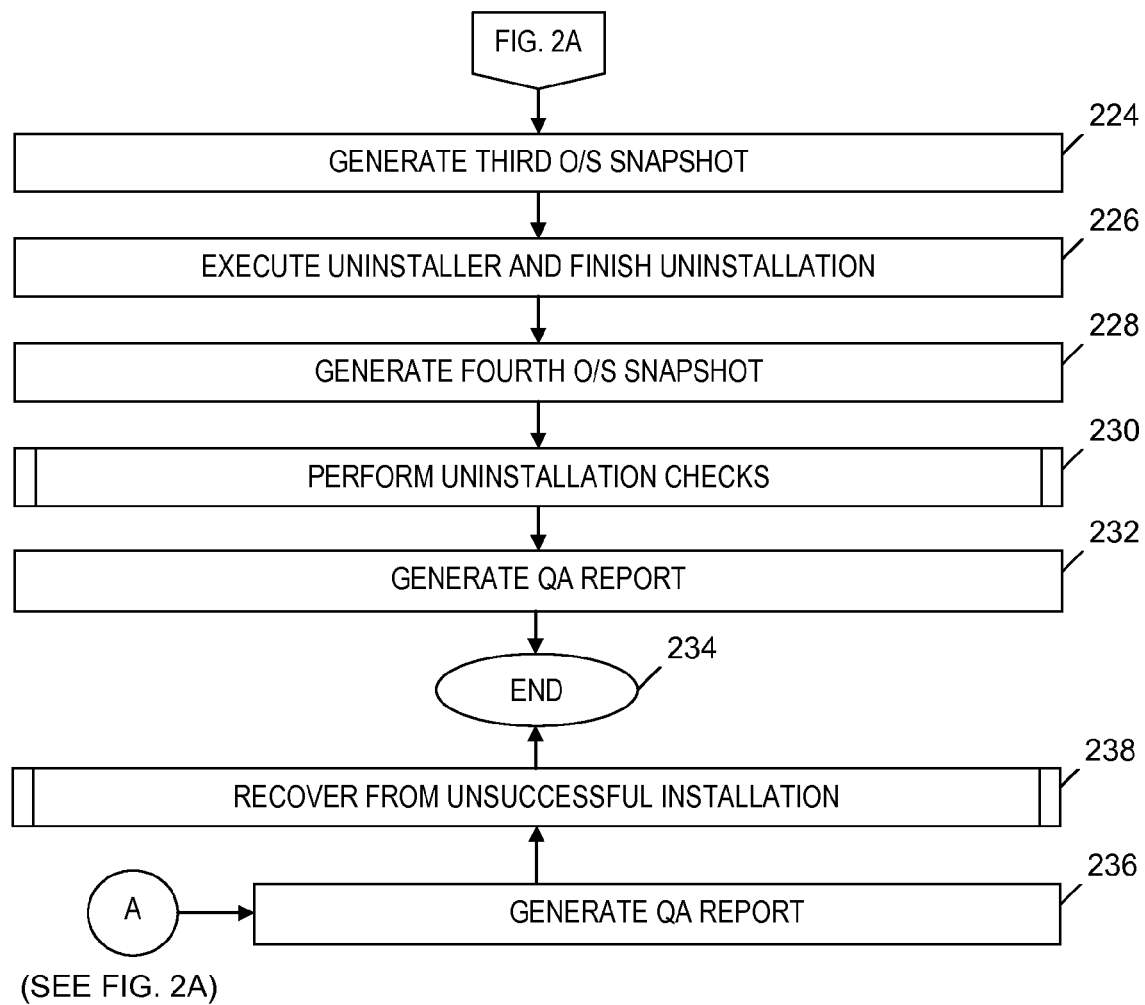

FIGS. 2A-2B depict a flowchart of a process of assuring quality of a software installer in the system of FIG. 1, in accordance with embodiments of the present invention. The process of FIGS. 2A-2B begins at step 200. In step 202, QA tool 104 (see FIG. 1) reads configuration file 122 (see FIG. 1).

In step 204, QA tool 104 (see FIG. 1) receives a selection of software installer 106 (see FIG. 1).

In step 206, O/S snapshot generator 108 (see FIG. 1) generates a first snapshot of an O/S of computer system 102 (see FIG. 1) and stores the first snapshot in O/S snapshots 124 (see FIG. 1) included in data repository 120 (see FIG. 1).

In step 208, QA tool 104 (see FIG. 1) initiates an execution of software installer 106 (see FIG. 1) to perform an installation of a software application, and subsequently determines that the installation is finished.

In step 210, O/S snapshot generator 108 (see FIG. 1) generates a second snapshot of the O/S of computer system 102 (see FIG. 1) and stores the second snapshot in O/S snapshots 124 (see FIG. 1) included in data repository 120 (see FIG. 1).

In step 212, O/S snapshot comparison analyzer compares the aforementioned first and second snapshots generated in steps 206 and 210, respectively. Using the result of the comparison of the first and second snapshots, O/S snapshot comparison analyzer 110 (see FIG. 1) determines changes resulting from the installation that finished in step 208. The aforementioned changes include components that were installed (i.e., the installed components), other components that were modified, and/or still other components that were deleted as a result of the installation that finished in step 208. The aforementioned components include installed, modified and deleted computer files and shortcut(s) to the software application whose installation was finished in step 208. O/S snapshot comparison analyzer 110 (see FIG. 1) stores the changes in database 126 (see FIG. 1) in data repository 120 (see FIG. 1). In one embodiment, the changes determined in step 212 are indicated by timestamp differences between the first and second snapshots.

In step 214, installation checks tool 112 (see FIG. 1) performs verification checks on the installation of the software application that finished in step 208. The verification checks on the installation are described below relative to FIG. 3A and FIG. 3B.

In step 216, QA tool 104 (see FIG. 1) determines whether the installation finished in step 208 was successful based on the installation checks performed in step 214. If QA tool 104

(see FIG. 1) determines in step 216 that the installation was successful, then the Yes branch of step 216 is taken and step 218 is performed.

In step 218, QA tool 104 (see FIG. 1) determines that a proper subset of the installed components (a.k.a. the selected installed components) determined and stored in step 212 are to be deleted, and subsequently deletes the selected installed components from database 126 (see FIG. 1). The selected installed components may include shortcuts that software installer 106 (see FIG. 1) runs, or particular files found on a data table generated by an MSI installer, or particular files identified by the comparison in step 212 if the software installer is an EXE installer. MSI installers and EXE installers are described below in the discussion of FIG. 3B.

In step 220, QA tool 104 (see FIG. 1) initiates a re-execution of software installer 106 (see FIG. 1) to perform a reinstallation of the software application, and subsequently determines that the reinstallation of the software application is finished.

In step 222, reinstallation checks tool 114 (see FIG. 1) performs verification checks on the reinstallation of the software application that finished in step 220. The verification checks on the reinstallation are described below relative to FIG. 4.

Following step 222, the process of FIGS. 2A-2B continues with step 224 in FIG. 2B. In step 224, O/S snapshot generator 108 (see FIG. 1) generates a third snapshot of the O/S and stores the third snapshot in O/S snapshots 124 (see FIG. 1) included in data repository 120 (see FIG. 1).

In step 226, QA tool 104 (see FIG. 1) initiates an execution of software installer 106 (see FIG. 1) or an uninstaller running on computer system 102 (see FIG. 1) to perform an uninstallation of the software application, and subsequently determines that the uninstallation is finished.

In step 228, O/S snapshot generator 108 (see FIG. 1) generates a fourth snapshot of the O/S and stores the fourth snapshot in O/S snapshots 124 (see FIG. 1) included in data repository 120 (see FIG. 1).

In step 230, uninstallation checks tool 116 (see FIG. 1) performs verification checks on the uninstallation of the software application that finished in step 226. The verification checks on the uninstallation are described below relative to FIG. 5.

In step 232, QA report generator 118 (see FIG. 1) generates QA report 128 (see FIG. 1). Following step 232, the process of FIGS. 2A-2B ends at step 234.

Returning to step 216 (see FIG. 2A), if QA tool 104 (see FIG. 1) determines that the installation was unsuccessful, then the No branch of step 216 (see FIG. 2A) is taken and step 236 is performed. In step 236, QA report generator 118 (see FIG. 1) generates QA report 128 (see FIG. 1). If software installer 106 (see FIG. 1) is an MSI installer, then step 238 follows step 236. In step 238, recovery tool 130 (see FIG. 1) automatically recovers from the unsuccessful (i.e., failed) installation. In one embodiment, step 238 includes the steps of the process of FIG. 6. Following step 238, the process of FIGS. 2A-2B ends at step 234. If software installer 106 (see FIG. 1) is an EXE installer, then following step 236, there is an optional manual recovery from the unsuccessful installation, and subsequently the process of FIGS. 2A-2B ends at step 234.

In one embodiment, the checks performed in steps 214 and 222 in FIG. 2A and step 230 in FIG. 2B include generating a specially designed semaphore on a display to visually indicate by different colors or other graphical elements the results of the checks. For example, the semaphore may show red to indicate the installation by software installer 106 (see FIG. 1) was unsuccessful.

Figure 3A:
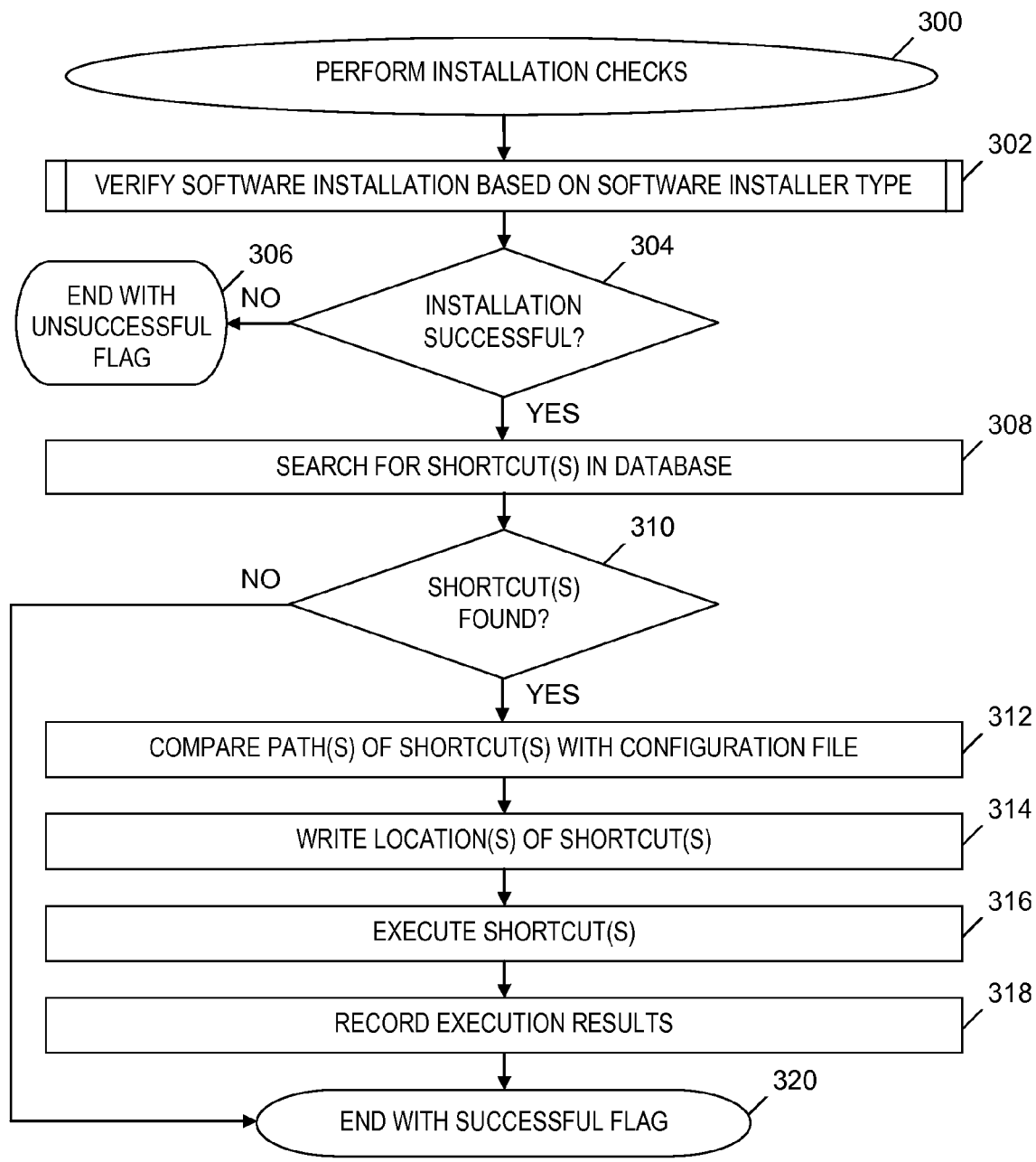
FIG. 3A is a flowchart of a process of performing installation checks in the process of FIGS. 2A-2B, in accordance with embodiments of the present invention.

FIG. 3A is a flowchart of a process of performing installation checks in the process of FIGS. 2A-2B, in accordance with embodiments of the present invention. In one embodiment, step 214 (see FIG. 2A) includes the process of FIG. 3A. The process of FIG. 3A begins at step 300. In step 302, installation checks tool 112 (see FIG. 1) verifies the installation of the software application based on whether the computer file of software installer 106 (see FIG. 1) has an .msi file extension or an .exe file extension. Step 302 includes the steps of FIG. 3B, described below. The result of step 302 is installation checks tool 112 (see FIG. 1) assigning a first value to a flag to indicate that the installation was successful or assigning a second value to a flag to indicate that the installation was unsuccessful. An .msi file extension indicates the computer file is a Microsoft® software installer offered by Microsoft Corporation located in Redmond, Wash. The software installer having an .msi file extension is used for installing Microsoft® Windows® software offered by Microsoft Corporation. Although the present invention discusses a computer file (in the singular) of software installer 106 (see FIG. 1), those skilled in the art will appreciate that the software installer may also include one or more other files that are used by the file having the .msi or .exe file name extension.

In step 304, installation checks tool 112 (see FIG. 1) determines whether the installation of the software application was successful based on whether the aforementioned flag has the first value (i.e., a successful flag indicating the installation was successful) or the second value (i.e., an unsuccessful flag indicating the installation was unsuccessful). If installation checks tool 112 (see FIG. 1) determines in step 304 that the installation of the software application was unsuccessful, then the No branch of step 304 is taken and the process of FIG. 3A ends with installation checks tool 112 (see FIG. 1) assigning a value to a flag to indicate the unsuccessful installation. If installation checks tool 112 (see FIG. 1) determines in step 304 that the installation of the software application was successful, then the Yes branch of step 304 is taken and step 308 is performed.

In step 308, installation checks tool 112 (see FIG. 1) searches for any shortcuts in the installation changes in database 126 included in data repository 120 (see FIG. 1). The installation changes were written to database 126 in step 212 (see FIG. 2A). In one embodiment, the changes written to database 126 in step 212 (see FIG. 2A) include one or more shortcuts to the software application.

In step 310, installation checks tool 112 (see FIG. 1) determines from the search in step 308 whether shortcut(s) were found in the database included in data repository 120 (see FIG. 1). If installation checks tool 112 (see FIG. 1) determines shortcut(s) were found in the search performed in step 308, then the Yes branch of step 310 is taken and step 312 is performed.

In step 312, installation checks tool 112 (see FIG. 1) determines path(s) of the found shortcut(s) and compares the path(s) of the shortcut(s) with path(s) of shortcut(s) in configuration file 122 (see FIG. 1). The path(s) in configuration file 122 (see FIG. 1) are the path(s) of shortcut(s) expected to exist after a successful installation of the software application. Also in step 312, installation checks tool 112 (see FIG. 1) writes the determined path(s) of shortcut(s) into QA report 128 (see FIG. 1).

In step 314, installation checks tool 112 (see FIG. 1) writes to data repository 120 (see FIG. 1) location(s) of the shortcut(s) found as a result of the search in step 308.

In step 316, installation checks tool 112 (see FIG. 1) initiates an execution of the shortcut(s) found as a result of the search in step 308. In one embodiment, shortcuts are executed in step 316 one by one, and with each execution, a human operator determines whether the shortcut being executed and the software application being launched by the shortcut are working properly.

In step 318, installation checks tool 112 (see FIG. 1) records in data repository 120 (see FIG. 1) the results of the execution initiated in step 316, where the recorded results are included in QA report 128 (see FIG. 1). The results recorded in step 318 may include the operator's determination whether each shortcut and the software application are working properly.

In step 320, the process of FIG. 3A ends with installation checks tool 112 (see FIG. 1) assigning a value to a flag to indicate the installation was successful.

Returning to step 310, if installation checks tool 112 (see FIG. 1) determines that no shortcut was found as a result of the search in step 308, then the No branch of step 310 is taken, and the process of FIG. 3A ends at step 320, with installation checks tool 112 (see FIG. 1) assigning a value to a flag to indicate the installation was successful.

Figure 3B:
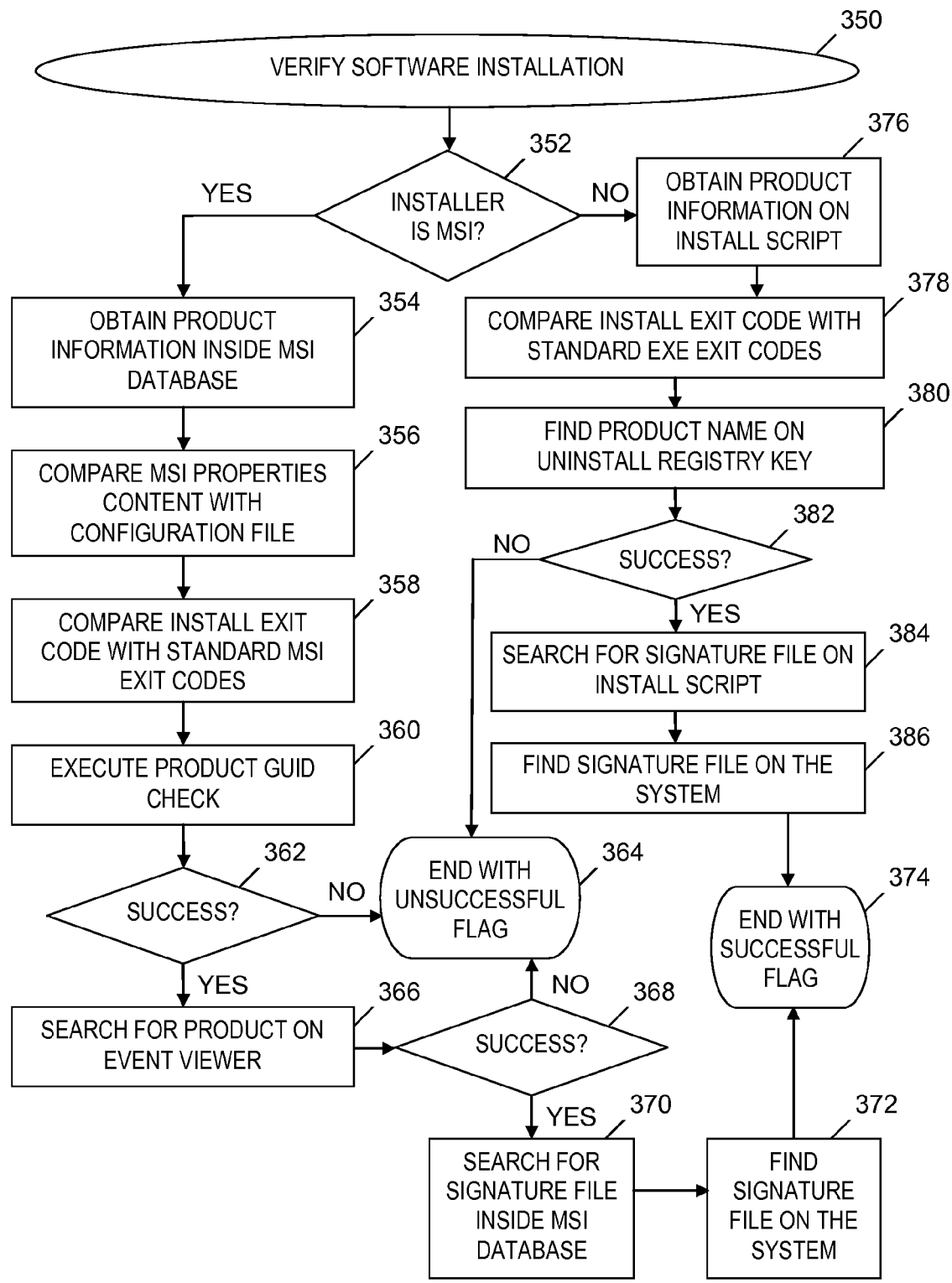
FIG. 3B is a flowchart of a process of verifying software installation in the process of FIG. 3A, in accordance with embodiments of the present invention.

FIG. 3B is a flowchart of a process of verifying software installation in the process of FIG. 3A, in accordance with embodiments of the present invention. In one embodiment, step 302 (see FIG. 3A) includes the process of FIG. 3B. The process of FIG. 3B starts at step 350. In step 352, installation checks tool 112 (see FIG. 1) determines whether software installer 106 (see FIG. 1) is an MSI installer (i.e., the computer file of software installer 106 (see FIG. 1) has an .msi file extension) or an EXE installer (i.e., the computer file of the software installer has an .exe file extension). If installation checks tool 112 (see FIG. 1) determines in step 352 that software installer 106 (see FIG. 1) is an MSI installer, then the Yes branch of step 352 is taken and step 354 is performed.

In step 354, installation checks tool 112 (see FIG. 1) obtains product information (i.e., information about the software application whose installation by software installer 106 (see FIG. 1) is being verified) by opening a database (i.e., MSI database) resulting from software installer 106 (see FIG. 1) installing the software application in step 208 (see FIG. 2A), and reading and collecting information from the opened database about the software application whose installation is being verified. In one embodiment, the MSI database is included in data repository 120 (see FIG. 1). The collected information includes a product code and a product name identifying the software application, and further includes properties (i.e., MSI properties) and computer files needed for verification of the installation of the software application. In one embodiment, step 354 also includes installation checks tool 112 (see FIG. 1) recording the aforementioned collected information in data repository 120 (see FIG. 1) and QA report generator 118 (see FIG. 1) including the recorded information in QA report 128 (see FIG. 1).

In step 356, installation checks tool 112 (see FIG. 1) compares the MSI properties collected in step 354 with properties in configuration file 122 (see FIG. 1) to determine whether the MSI properties match the properties in configuration file 122 (see FIG. 1) (i.e., match the expected properties of an MSI installer). For example, the properties included in the collected information may include a first indicator that software installer 106 (see FIG. 1) is to be installed for all users of computer system 102 (see FIG. 1), or a second indicator that software installer 106 (see FIG. 1) is to be installed for only one particular user. In one embodiment, step 356 also includes installation checks tool 112 (see FIG. 1) recording the result of the comparison in step 356 in data repository 120 (see FIG. 1) and QA report generator 118 (see FIG. 1) including the recorded result in QA report 128 (see FIG. 1).

In step 358, installation checks tool 112 (see FIG. 1) compares an exit code returned from the installation that finishes in step 208 (see FIG. 2A) with standard MSI exit codes that can result from executing an MSI installer (i.e., Microsoft® Standard Exit Codes provided by Microsoft Corporation) and determines which of the standard MSI exit codes matches the exit code returned from the installation. The comparison performed in step 358 retrieves the standard exit codes from data repository 120 (see FIG. 1). In one embodiment, the standard exit codes includes an exit code of "0" which indicates that the installation was successful. In one embodiment, step 358 also includes installation checks tool 112 (see FIG. 1) recording the result of the aforementioned exit code comparison in data repository 120 (see FIG. 1) and QA report generator 118 (see FIG. 1) adding the recorded result to QA report 128 (see FIG. 1).

As used herein, an exit code is a code returned by software installer 106 (see FIG. 1) installing, reinstalling or uninstalling the software application, where the code indicates the installation, reinstallation or uninstallation was completed successfully or indicates a particular error that occurred to make the installation, reinstallation or uninstallation unsuccessful. For example, a software installer that is installing a software suite S needs Application A to be installed. The software installer verifies if Application A is installed. If the software installer determines Application A is not installed, then the exit code matches error code "100." A standard error code list includes error code 100 and its meaning that Application A is needed for the installation of software suite S, but that Application A is not installed.

In step 360, installation checks tool 112 (see FIG. 1) executes a product globally unique identifier (product GUID) check. A product GUID is a unique reference number that identifies the software application whose installation is being verified in the process of FIG. 3B. A product GUID check includes installation checks tool 112 (see FIG. 1) determining whether the product code collected in step 354 matches a code specifying the software application, where the code is retrieved from a system dynamic-link library (DLL) file or registry of computer system 102 (see FIG. 1). If the product code matches the retrieved code, then the product GUID check indicates a successful installation. In one embodiment, step 360 also includes installation checks tool 112 (see FIG. 1) recording the result of the product GUID check in data repository 120 (see FIG. 1) and QA report generator 118 (see FIG. 1) including the recorded result in QA report 128 (see FIG. 1).

In step 362, installation checks tool 112 (see FIG. 1) determines whether the installation of the software application that finished in step 208 (see FIG. 2A) is successful based on the results of steps 356, 358 and 360. If the comparison in step 356 determines that the MSI properties does not match the properties in configuration file 122 (see FIG. 1), the comparison in step 358 determines that the exit code returned from the installation does not match a standard MSI exit code indicating a successful installation, or the product GUID check in step 360 determines that the product code collected in step 354 does not match a code of the software application retrieved from a DLL file of computer system 102 (see FIG. 1), then in step 362, installation checks tool 112 (see FIG. 1) determines that the installation of the software application is unsuccessful, the No branch of step 362 is taken, and the process of FIG. 3B ends at step 364, with installation checks tool 112 (see FIG. 1) assigning a value to a flag indicating that the installation was unsuccessful.

If the comparison in step 356 determines that the MSI properties match the properties in configuration file 122 (see FIG. 1), the comparison in step 358 determines that the exit code returned from the installation matches a standard MSI exit code indicating a successful installation, and the product GUID check in step 360 determines that the product code collected in step 354 matches a code of the software application retrieved from a DLL file of computer system 102 (see FIG. 1), then in step 362, installation checks tool 112 (see FIG. 1) determines that the installation of the software application is a success, the Yes branch of step 362 is taken, and step 366 is performed.

In step 366, installation checks tool 112 (see FIG. 1) searches for the product name collected in step 354, where the search is done on log files maintained by an event viewer of the operating system of computer system 102 (see FIG. 1). The log files store all the events occurring on the operating system of computer system 102 (see FIG. 1). The events included in the log files include an installation of the software application or software installer 106 (see FIG. 1), and includes text indicating whether the installation was successful. The search in step 366 also includes a search of the log files of the event viewer for particular text that indicates the installation is successful or for other text that indicates the installation is unsuccessful. Installation checks tool 112 (see FIG. 1) determines the installation was successful if the search in step 366 finds the product name in the log files and finds the particular text that indicates a successful installation.

In step 368, installation checks tool 112 (see FIG. 1) determines whether the installation of the software application is a success by determining whether the search in step 366 finds an error in the product name. If installation checks tool 112 (see FIG. 1) in step 368 determines that no error was found in the search performed in step 366, then the Yes branch is taken and step 370 is performed.

In step 370, installation checks tool 112 (see FIG. 1) searches inside the aforementioned MSI database and finds a signature file (a.k.a. sign file or signed file) included in configuration file 122 (see FIG. 1). In one embodiment, step 370 also includes installation checks tool 112 (see FIG. 1) recording the result of the search for the signature file in data repository 120 (see FIG. 1) and QA report generator 118 (see FIG. 1) including the recorded result in QA report 128 (see FIG. 1). A signature file is used to keep track of what computer systems have received a software distribution.

In step 372, installation checks tool 112 (see FIG. 1) determines that the signature file found in step 370 matches a signature file included in the second snapshot generated in step 210 (see FIG. 2A). The match determined in step 372 ensures that the signature file was installed by the installation that finished in step 208 (see FIG. 2A).

Based on the match in step 372 ensuring that the signature file found in step 370 was installed, installation checks tool 112 (see FIG. 1) assigns a value to a flag to indicate that the installation of the software application was successful and the process of FIG. 3B ends at step 374.

Returning to step 368, if installation checks tool 112 (see FIG. 1) determines that the installation of the software application is unsuccessful by determining the search in step 366 finds an error in the product name, then the No branch of step 368 is taken and the process of FIG. 3B ends at step 364, with installation checks tool 112 (see FIG. 1) assigning a value to a flag to indicate the installation of the software application was unsuccessful.

Returning to step 352, if installation checks tool 112 (see FIG. 1) determines software installer 106 (see FIG. 1) is an EXE installer, then the No branch of step 352 is taken and step 376 is performed.

In step 376, installation checks tool 112 (see FIG. 1) extracts product information from a developer's install script or source code for installing the software application. The product information includes the product name identifying the software application. In one embodiment, a script analyzer (not shown in FIG. 1) extracts the aforementioned product information in step 376.

In step 378, installation checks tool 112 (see FIG. 1) reads an exit code returned from the installation that finished in step 208 (see FIG. 2A) and compares the returned exit code with exit codes on a standard exit code list that was used for the type of software installer 106 (see FIG. 1) that was determined in step 352 (i.e., an EXE installer). The standard exit code list is created by a developer of the EXE installer and stored in data repository 120 (see FIG. 1). In one embodiment, an exit code of "0" indicates that the installation was successful. In one embodiment, step 378 also includes installation checks tool 112 (see FIG. 1) recording the result of the exit code comparison in step 378 in data repository 120 (see FIG. 1) and QA report generator 118 (see FIG. 1) including the recorded result in QA report 128 (see FIG. 1).

In step 380, installation checks tool 112 (see FIG. 1) searches for and finds a product name on an uninstall registry key. Finding a remove button in the uninstall registry that corresponds to the product name means that the installation successfully finished all of its tasks because creating the remove button on the uninstall registry is the last action performed by an EXE installer.

In step 382, installation checks tool 112 (see FIG. 1) determines whether the installation is a success based on whether the comparison in step 378 determines the returned exit code matches a standard exit code from the standard exit code list, and based on whether the product name found in step 380 matches the product name extracted in step 376.

If installation checks tool 112 (see FIG. 1) determines in step 382 that the returned exit code matches a standard exit code and the product name found in step 380 matches the product name extracted in step 376, then installation checks tool 112 (see FIG. 1) determines the installation is a success, the Yes branch of step 382 is taken and step 384 is performed.

In step 384, installation checks tool 112 (see FIG. 1) searches for and extracts a location of a signature file on the aforementioned install script or installation source code. Subsequently, installation checks tool 112 (see FIG. 1) retrieves the signature file whose location was extracted in step 384. In one embodiment, step 384 also includes installation checks tool 112 (see FIG. 1) recording the result of the search for the location of the signature file in data repository 120 (see FIG. 1) and QA report generator 118 (see FIG. 1) including the recorded result in QA report 128 (see FIG. 1).

In step 386, installation checks tool 112 (see FIG. 1) finds a signature file in the second snapshot of the O/S generated in step 210 (see FIG. 2A). Following step 386, installation checks tool 112 (see FIG. 1) determines the signature file whose location was extracted in step 384 matches the signature in the second snapshot generated in step 210 (see FIG. 2A). Based on the aforementioned match of the signature files, installation checks tool 112 (see FIG. 1) determines the installation was successful and assigns a value to a flag indicating the installation was successful. Following step 386, the process of FIG. 3B ends at step 374.

Returning to step 382, if installation checks tool 112 (see FIG. 1) determines that the returned exit code does not match a standard exit code that indicates a successful installation or the product name found in step 380 does not match the product name extracted in step 376, then installation checks tool 112 (see FIG. 1) determines the installation is unsuccessful, the No branch of step 382 is taken and the process of FIG. 3B ends at step 364, with installation checks tool 112 (see FIG. 1) assigning a value to a flag indicating that the installation was unsuccessful.

Process for Assuring Quality of a Reinstallation by a Software Installer

Figure 4:
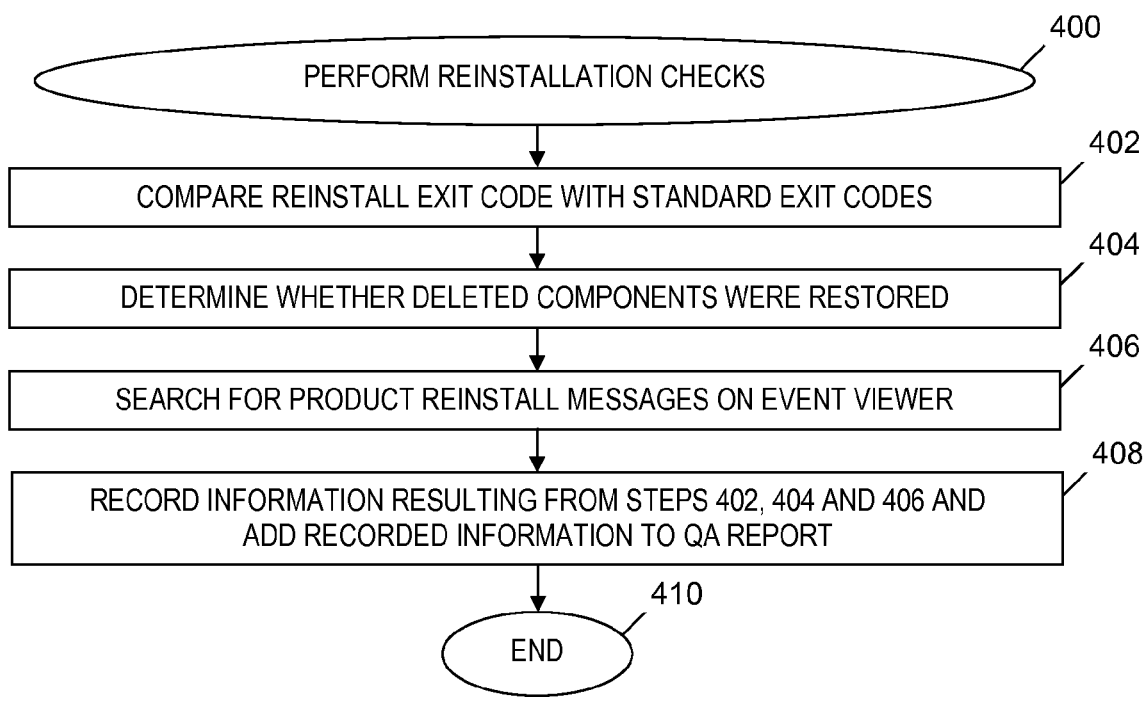
FIG. 4 is a flowchart of a process of performing reinstallation checks in the process of FIGS. 2A-2B, in accordance with embodiments of the present invention.

FIG. 4 is a flowchart of a process of performing reinstallation checks in the process of FIGS. 2A-2B, in accordance with embodiments of the present invention. In one embodiment, step 222 (see FIG. 2A) includes the process of FIG. 4. The process of FIG. 4 starts at step 400. In step 402, reinstallation checks tool 114 (see FIG. 1) reads the exit code returned from the reinstallation finished in step 220 (see FIG. 2A) and compares the returned exit code with standard exit codes. The standard exit codes are standard MSI exit codes if step 352 (see FIG. 3B) determines that software installer 106 (see FIG. 1) is an MSI installer or are standard EXE exit codes if step 352 (see FIG. 3B) determines that software installer 106 (see FIG. 1) is an EXE installer. The comparison performed in step 402 retrieves the standard exit codes from data repository 120 (see FIG. 1).

In step 404, reinstallation checks tool 114 (see FIG. 1) reads database 126 (see FIG. 1) to search for and find previously installed components that were deleted in step 218 (see FIG. 2A), and subsequently determines whether the installed components that had been deleted in step 218 (see FIG. 1) were restored by the reinstallation that was finished in step 220 (see FIG. 2A). Determining the previously deleted components were restored includes determining the previously deleted components are present in computer system 102 (see FIG. 1).

In step 406, reinstallation checks tool 114 (see FIG. 1) searches for any message in the event viewer of the O/S of computer system 102 (see FIG. 1) that includes the product name of the software application reinstalled by the reinstallation that finished in step 220 (see FIG. 2A).

In step 408, reinstallation checks tool 114 (see FIG. 1) records the information resulting from steps 402, 404 and 406 in data repository 120 (see FIG. 1), and subsequently, QA report generator 118 (see FIG. 1) retrieves the recorded information resulting from steps 402, 404 and 406 to include in QA report 128 (see FIG. 1).

Although not shown, reinstallation checks tool 114 (see FIG. 1) determines that the reinstallation that finished in step 220 was successful if the comparison in step 402 results in the returned exit code matching one of the standard exit codes, all the components deleted in step 218 (see FIG. 2A) are determined in step 404 to be restored, and the product name is found in the event viewer messages in step 406. Reinstallation checks tool 114 (see FIG. 1) determines that the reinstallation that finished in step 220 was unsuccessful if the comparison in step 402 results in the returned exit code not matching any of the standard exit codes, not all of the components deleted in step 218 (see FIG. 2A) are determined in step 404 to be restored, or the product name is not found in any event viewer message in step 406.

Following step 408, the process of FIG. 4 ends at step 410.

Process for Assuring Quality of an Uninstallation by a Software Installer

Figure 5:
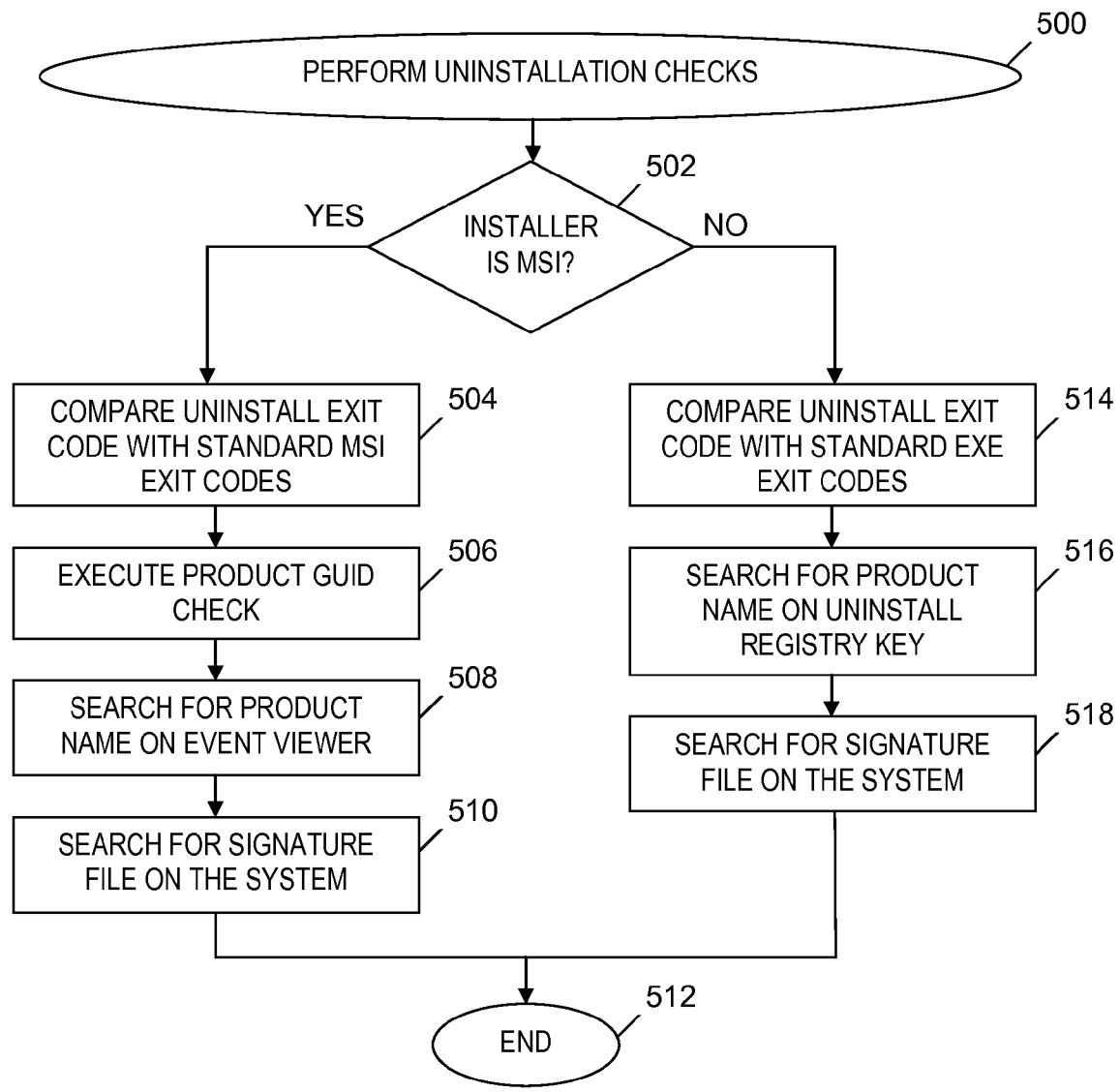
FIG. 5 is a flowchart of a process of performing uninstallation checks in the process of FIGS. 2A-2B, in accordance with embodiments of the present invention.

FIG. 5 is a flowchart of a process of performing uninstallation checks in the process of FIGS. 2A-2B, in accordance with embodiments of the present invention. In one embodiment, step 230 (see FIG. 2B) includes the process of FIG. 5.

The process of FIG. 5 starts at step 500. In step 502, uninstallation checks tool 116 (see FIG. 1) determines whether software installer 106 (see FIG. 1) is an MSI installer (i.e., the computer file of software installer 106 (see FIG. 1) has an .msi file extension) or an EXE installer (i.e., the computer file of software installer 106 (see FIG. 1) has an .exe file extension). If uninstallation checks tool 116 (see FIG. 1) determines in step 502 that software installer 106 (see FIG. 1) is an MSI installer, then the Yes branch of step 502 is taken and step 504 is performed.

In step 504, uninstallation checks tool 116 (see FIG. 1) compares the exit code returned from the uninstallation that finishes in step 226 (see FIG. 2B) with standard MSI exit codes that can result from executing an MSI installer (i.e., Microsoft® Standard Exit Codes) and determines which of the standard MSI exit codes match the exit code returned from the uninstallation. The comparison performed in step 504 retrieves standard MSI exit codes from data repository 120 (see FIG. 1). In one embodiment, step 504 also includes uninstallation checks tool 116 (see FIG. 1) recording the result of the exit code comparison in step 504, and QA report generator 118 (see FIG. 1) including the recorded result in QA report 128 (see FIG. 1).

Prior to step 506 and after the Yes branch of step 502, uninstallation checks tool 116 (see FIG. 1) obtains product information (i.e., information about the software application whose uninstallation is being verified) by opening the MSI database resulting from the uninstallation that finishes in step 226 (see FIG. 2B), and reading and collecting information from the opened database about the software application whose uninstallation is being verified. In one embodiment, the collected information includes a product code identifying the software application.

In step 506, uninstallation checks tool 116 (see FIG. 1) executes a product GUID check, which includes uninstallation checks tool 116 (see FIG. 1) determining whether the product code collected prior to step 506 and after the Yes branch of step 502 does not match a code specifying the software application in a system DLL file of computer system 102 (see FIG. 1).

In step 508, uninstallation checks tool 116 (see FIG. 1) searches for the product name collected prior to step 506 and after the Yes branch of step 502, where the search is done on log files maintained by the event viewer of the operating system of computer system 102 (see FIG. 1). The search in step 508 also includes a search of the log files for particular text that indicates the uninstallation is successful or for other text that indicates the uninstallation is unsuccessful. Uninstallation checks tool 116 (see FIG. 1) determines the uninstallation was successful if the search in step 508 finds the product name in the log files and finds the particular text that indicates a successful uninstallation.

In step 510, uninstallation checks tool 116 (see FIG. 1) searches inside the aforementioned MSI database to determine whether a signature file does not exist in the MSI database, where the signature file being searched for is included in configuration file 122 (see FIG. 1). In one embodiment, step 510 also includes uninstallation checks tool 116 (see FIG. 1) recording in data repository 120 (see FIG. 1) the result of the search for the signature file and QA report generator 118 (see FIG. 1) including the recorded result in QA report 128 (see FIG. 1).

After step 510 and prior to step 512, uninstallation checks tool 116 (see FIG. 1) determines whether the uninstallation of the software application that finished in step 226 (see FIG. 2B) is successful based on the results of steps 504, 506, 508 and 510. If the comparison in step 504 determines that the exit code returned from the uninstallation does not match a standard MSI exit code, the product GUID check in step 506 determines that the product code collected prior to step 506 matches a code of the software application retrieved from a DLL file of computer system 102 (see FIG. 1), the search for the product name in step 508 results in finding error(s) in the product name, and/or step 510 determines that the signature file exists in the MSI database, then uninstallation checks tool 116 (see FIG. 1) determines that the uninstallation of the software application that was finished in step 226 (see FIG. 2B) is unsuccessful and the process of FIG. 5 ends at step 512.

If the comparison in step 504 determines that the exit code returned from the uninstallation matches a standard MSI exit code, the product GUID check in step 506 determines that the product code collected prior to step 506 and after the Yes branch of step 502 does not match a code specifying the software application retrieved from a DLL file of computer system 102 (see FIG. 1), the product name found in step 508 has no errors, and the signature file searched for in step 510 does not exist, then uninstallation checks tool 116 (see FIG. 1) determines that the uninstallation of the software application is a success and the process of FIG. 5 ends at step 512.

Returning to step 502, if uninstallation checks tool 116 (see FIG. 1) determines software installer 106 (see FIG. 1) is an EXE installer, then the No branch of step 502 is taken and step 514 is performed.

In step 514, uninstallation checks tool 116 (see FIG. 1) reads the exit code returned from the uninstallation that finished in step 226 (see FIG. 2B) and compares the returned exit code with exit codes on a standard exit code list that was used for the type of software installer 106 (see FIG. 1) that was determined in step 502 (i.e., standard exit codes that had been developed for an EXE installer). In one embodiment, the standard exit code list is stored in data repository 120 (see FIG. 1). In one embodiment, step 514 also includes uninstallation checks tool 116 (see FIG. 1) recording in data repository 120 (see FIG. 1) the result of the exit code comparison in step 514, and QA report generator 118 (see FIG. 1) including the recorded result in QA report 128 (see FIG. 1).

Prior to step 516 and after the No branch of step 502, uninstallation checks tool 116 (see FIG. 1) extracts product information from a developer's install script or source code for installing the software application. In one embodiment, the extracted product information includes the product name identifying the software application.

In step 516, uninstallation checks tool 116 (see FIG. 1) searches for the extracted product name and determines whether the extracted product name does not exist on the uninstall registry key.

In step 518, uninstallation checks tool 116 (see FIG. 1) searches for and extracts a location of a signature file on the aforementioned install script or installation source code. Subsequently, uninstallation checks tool 116 (see FIG. 1) retrieves the signature file whose location was extracted in step 384. In step 386, uninstallation checks tool 116 (see FIG. 1) determines whether the retrieved signature file does not exist in the fourth snapshot of the O/S generated in step 228 (see FIG. 2B). In one embodiment, step 518 also includes uninstallation checks tool 116 (see FIG. 1) recording in data repository 120 (see FIG. 1) the result of the search for the signature file and QA report generator 118 (see FIG. 1) including the recorded result in QA report 128 (see FIG. 1).

After step 518 and prior to step 512, uninstallation checks tool 116 (see FIG. 1) determines whether the uninstallation is a success based on the results of steps 514, 516 and 518. After step 518, the process of FIG. 5 ends at step 512.

If uninstallation checks tool 116 (see FIG. 1) determines in step 514 that the returned exit code matches a standard exit code that indicates a successful uninstallation, the product name searched for in step 516 does not exist in the uninstall registry key, and the signature file searched for in step 518 does not exist in the fourth snapshot of the O/S of computer system 102 (see FIG. 1), then uninstallation checks tool 116 (see FIG. 1) determines the uninstallation is successful.

If uninstallation checks tool 116 (see FIG. 1) determines in step 514 that the returned exit code does not match a standard exit code that indicates a successful uninstallation, the product name searched for in step 516 exists in the uninstall registry key, and/or the signature file searched for in step 518 exists in the fourth snapshot of the O/S of computer system 102 (see FIG. 1), then uninstallation checks tool 116 (see FIG. 1) determines the uninstallation is unsuccessful.

Recovering from an Unsuccessful Installation

Figure 6:
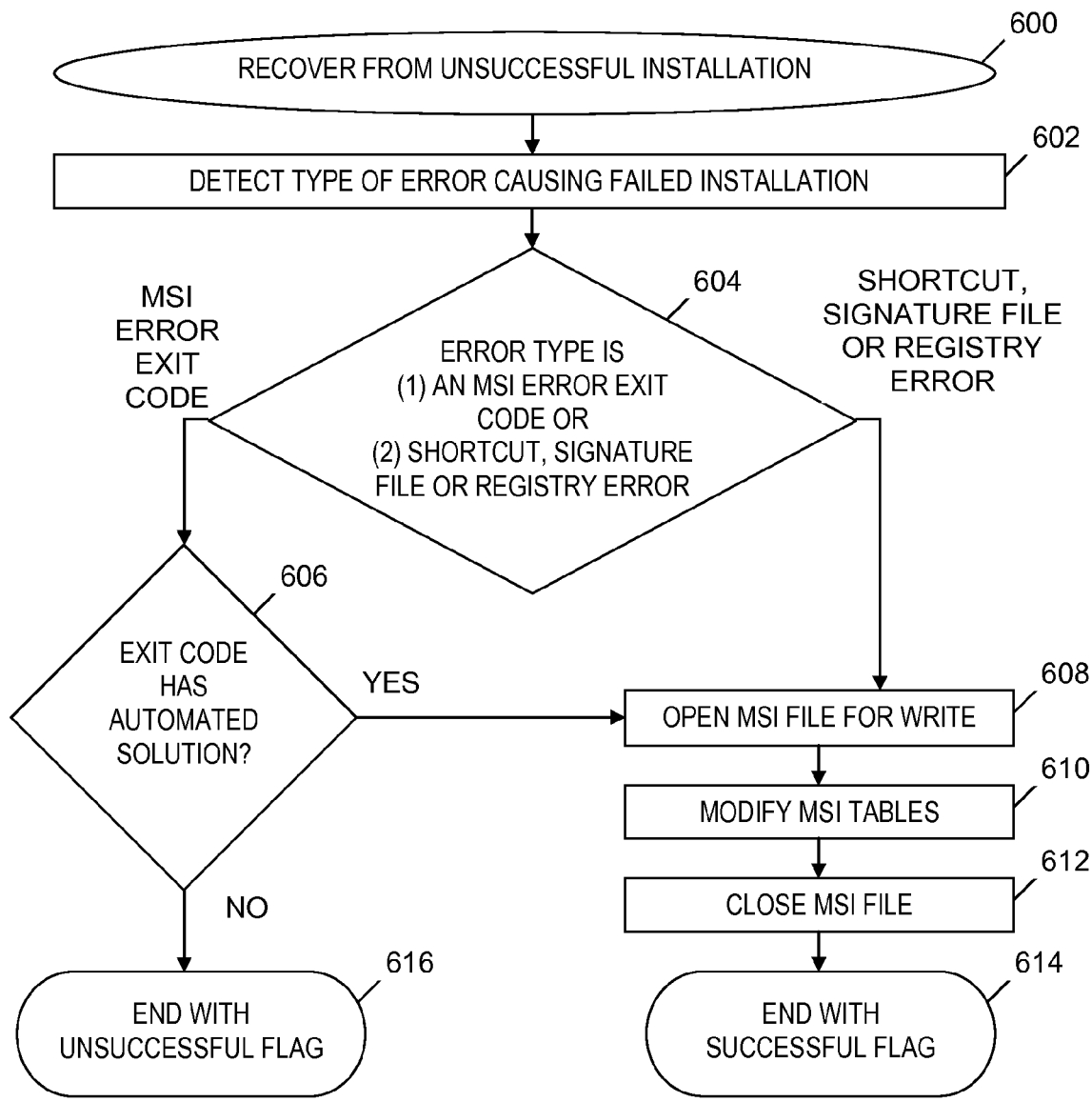
FIG. 6 is a flowchart of a process of recovering from an unsuccessful installation determined in the process of FIGS. 2A-2B, in accordance with embodiments of the present invention.

FIG. 6 is a flowchart of a process of recovering from an unsuccessful installation determined in the process of FIGS. 2A-2B, in accordance with embodiments of the present invention. In one embodiment, step 238 (see FIG. 2B) includes the process of FIG. 6 and software installer 106 (see FIG. 1) is an MSI installer. The process of FIG. 6 starts at step 600. In step 602, recovery tool 130 (see FIG. 1) detects a type of error that caused the unsuccessful installation, which is indicated by the flag assigned in step 364 (see FIG. 3B), indicated by a comparison of the signature files found in steps 370 and 372 in FIG. 3B, or indicated by the comparison of shortcut paths in step 312 (see FIG. 3A). The type of error detected in step 602 includes (1) an MSI error exit code (i.e., the comparison in step 358 (see FIG. 3B) determines that the exit code resulting from the installation matches one of multiple standard MSI exit codes in data repository 120 (see FIG. 1) (e.g., codes other than the "0" code indicating a successful installation), where each of the standard MSI exit codes indicates a corresponding error; (2) a shortcut error (i.e., the comparison in step 312 (see FIG. 3A) determines that path(s) of shortcut(s) in configuration file 122 (see FIG. 1) do not match path(s) of shortcut(s) found in step 310 (see FIG. 3A); (3) a signature file error (i.e., the signature file is not found in the search in step 370 in FIG. 3B); or (4) registry error (i.e., the product GUID check in step 360 (see FIG. 3B) results in not finding a match between the product code collected in step 354 (see FIG. 3B) and the code retrieved from the DLL file).

In step 604, recovery tool 130 (see FIG. 1) determines whether the error type detected in step 602 is (1) an MSI error exit code or (2) a shortcut, signature file, or registry error. If recovery tool 130 (see FIG. 1) in step 604 determines the error type is an MSI error exit code, then the left branch of step 604 is taken and step 606 is performed.

In step 606, recovery tool 130 (see FIG. 1) determines whether the particular error indicated by the MSI error exit code has an automated solution. If recovery tool 130 (see FIG. 1) determines in step 606 that the error indicated by the MSI error exit code has an automated solution, then the Yes branch of step 606 is taken and step 608 is performed. In one embodiment, data repository 120 (see FIG. 1) stores an association between the standard MSI error exit codes and respective automated solutions for the errors indicated by the standard MSI error exit codes.

In step 608, recovery tool 130 (see FIG. 1) opens the computer file of the MSI installer (i.e., the MSI file) for a write operation. In step 610, recovery tool 130 (see FIG. 1) modifies the MSI tables in the MSI file to correct the particular error indicated by the detected MSI error exit code detected in step 602. In step 612, recovery tool 130 (see FIG. 1) closes the MSI file and assigns a value to a flag indicating the installation was successful. Following step 612, the process of FIG. 6 ends at step 614.

Returning to step 606, if recovery tool 130 (see FIG. 1) determines that the error indicated by the MSI error exit code does not have an automated solution, then the No branch of step 606 is taken and recover tool 130 (see FIG. 1) assigns a value to a flag indicating the installation was unsuccessful. Following the No branch of step 606, the process of FIG. 6 ends at step 616.

Returning to step 604, if recovery tool 130 (see FIG. 1) determines the error type is a shortcut error, signature file error, or registry error, then the right branch of step 604 is taken and step 608 is performed. In step 608 following the right branch of step 604, recovery tool 130 (see FIG. 1) opens the MSI file for write operations. In step 610, recovery tool 130 (see FIG. 1) modifies the MSI tables in the MSI file to correct the particular error whose type was detected in step 602. In step 612, recovery tool 130 (see FIG. 1) closes the MSI file and assigns a value to a flag indicating the installation was successful. Following step 612, the process of FIG. 6 ends at step 614.

Automatically Testing an Application

Figure 7:
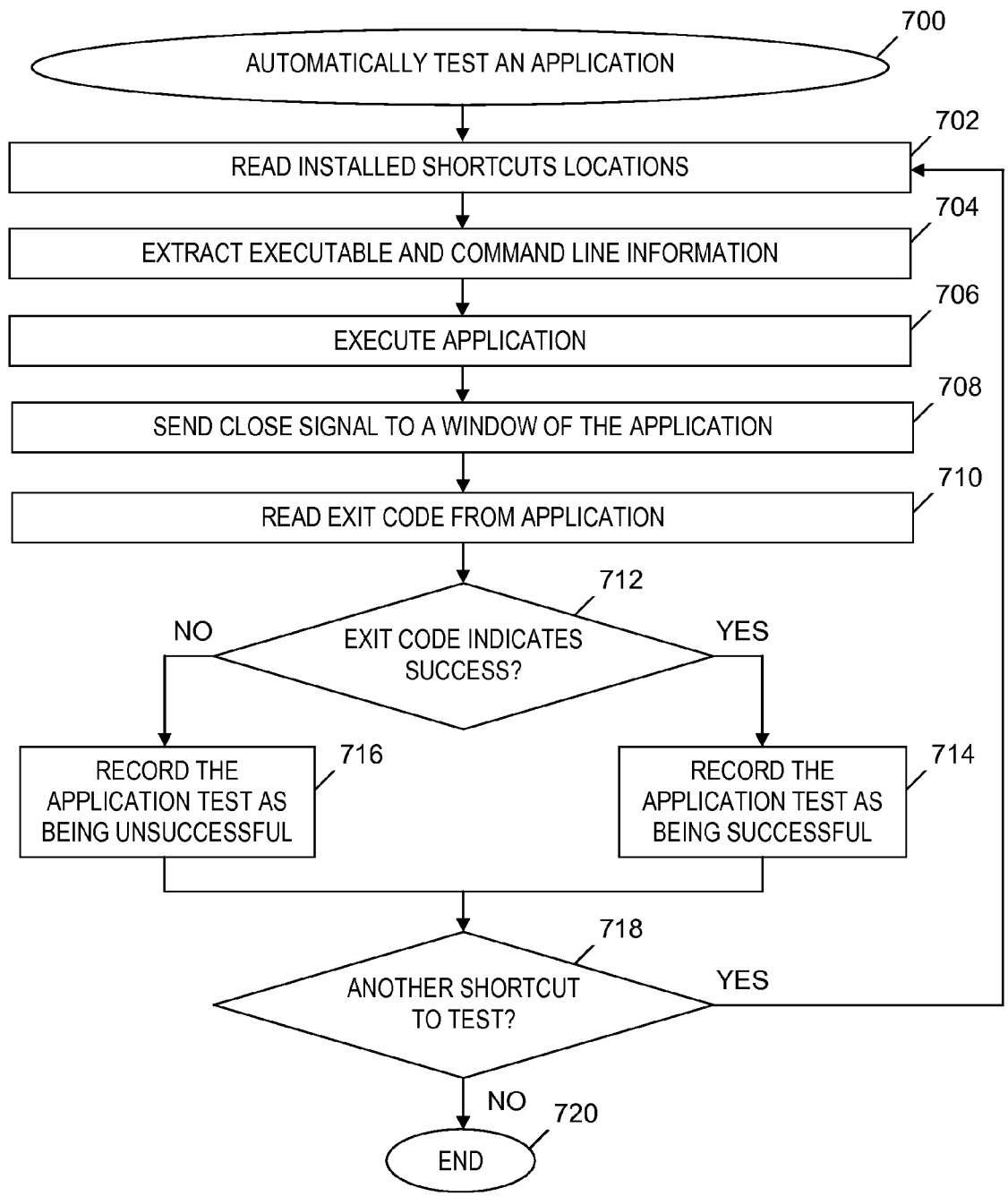
FIG. 7 is a flowchart of a sub-process of automatically testing an application, which is included in the process of FIG. 3A, in accordance with embodiments of the present invention.

FIG. 7 is a flowchart of a sub-process of automatically testing an application, which is included in the process of FIG. 3A, in accordance with embodiments of the present invention. In one embodiment, step 318 (see FIG. 3A) is replaced with the process of FIG. 7 to provide an automatic test of the software application whose installation is checked in the process of FIG. 3A. The process of FIG. 7 begins at step 700 after the software application and shortcut(s) to the software application have been installed in step 208 (see FIG. 2A). In step 702, installation checks tool 112 (see FIG. 1) reads a location of an installed shortcut to the installed software application. In one embodiment, the location is read in step 702 from database 126 (see FIG. 1).

In step 704, installation checks tool 112 (see FIG. 1) extracts executable and command line information inside the shortcut whose location was read in step 702. The extracted executable and command line information indicates how to execute the software application. In one embodiment, the executable and command line information is extracted from database 126 (see FIG. 1).

In step 706, by using the executable and command line information extracted in step 704, installation checks tool 112 (see FIG. 1) executes the software application to test the software application.

In step 708, installation checks tool 112 (see FIG. 1) monitors the software application as it is running and sends a close signal to a window of the software application.

In step 710, installation checks tool 112 (see FIG. 1) reads the exit code from the software application.

In step 712, installation checks tool 112 (see FIG. 1) determines whether the exit code read in step 710 indicates the software application test was a success or a failure. If installation checks tool 112 (see FIG. 1) in step 712 determines the exit code read in step 710 indicates the software application test was successful, then the Yes branch of step 712 is taken and step 714 is performed.

In step 714, installation checks tool 112 (see FIG. 1) records in data repository 120 (see FIG. 1) the software application test as being successful.

Returning to step 712, if installation checks tool 112 (see FIG. 1) determines that the exit code read in step 710 indicates the software application test was unsuccessful, then the No branch of step 712 is taken and step 716 is performed.

In step 716, installation checks tool 112 (see FIG. 1) records in data repository 120 (see FIG. 1) the software application test as being unsuccessful.

Step 718 is performed after step 714 and after step 716. In step 718, installation checks tool 112 (see FIG. 1) determines whether there is another shortcut to the software application that is not yet tested in the process of FIG. 7. If installation checks tool 112 (see FIG. 1) determines in step 718 that there is another shortcut to be tested, then the Yes branch of step 718 is taken and the process repeats starting at step 702. Otherwise, if there are no other shortcuts to be tested, then the No branch of step 718 is taken and the process of FIG. 7 ends at step 720. In one embodiment, installation checks tool 112 (see FIG. 1) determines whether there is another shortcut to be tested by identifying the shortcuts to be tested from shortcut information stored in database 126 (see FIG. 1).

Computer System

FIG. 8 is a block diagram of a computer system included in the system of FIG. 1 and that implements the processes of FIGS. 2A-2B, FIG. 3A, FIG. 3B, FIG. 4, FIG. 5, FIG. 6, and FIG. 7, in accordance with embodiments of the present invention. Computer system 102 generally includes a central processing unit (CPU) 802, a memory 804, an input/output (I/O) interface 806, and a bus 808. Further, computer system 102 is coupled to I/O devices 810 and a computer data storage unit 812. CPU 802 performs computation and control functions of computer system 102, including executing instructions included in program code 814, 816 and 818 to perform a method of assuring quality of a software installer, where the instructions are executed by CPU 802 via memory 804. CPU 802 may include a single processing unit, or be distributed across one or more processing units in one or more locations (e.g., on a client and server). Program code 814 includes program code for QA tool 104 (see FIG. 1). Program code 816 includes program code for software installer 106 (see FIG. 1). Program code 818 includes program code for recovery tool 130 (see FIG. 1).

Memory 804 includes a known computer-readable storage medium, which is described below. In one embodiment, cache memory elements of memory 804 provide temporary storage of at least some program code (e.g., program code 814, 816 and 818) in order to reduce the number of times code must be retrieved from bulk storage while instructions of the program code are executed. Moreover, similar to CPU 802, memory 804 may reside at a single physical location, including one or more types of data storage, or be distributed across a plurality of physical systems in various forms. Further, memory 804 can include data distributed across, for example, a local area network (LAN) or a wide area network (WAN).

I/O interface 806 includes any system for exchanging information to or from an external source. I/O devices 810 include any known type of external device, including a display device (e.g., monitor), keyboard, mouse, printer, speakers, handheld device, facsimile, etc. I/O devices 810 includes display device 118 (see FIG. 1). Bus 808 provides a communication link between each of the components in computer system 102, and may include any type of transmission link, including electrical, optical, wireless, etc.

I/O interface 806 also allows computer system 102 to store information (e.g., data or program instructions such as program code 814, 816 and 818) on and retrieve the information from computer data storage unit 812 or another computer data storage unit (not shown). In one embodiment, program code 814, 816 and 818 are stored on computer data storage unit 812. Computer data storage unit 812 includes a known computer-readable storage medium, which is described below. For example, computer data storage unit 812 may be a nonvolatile data storage device, such as a magnetic disk drive (i.e., hard disk drive) or an optical disc drive (e.g., a CD-ROM drive which receives a CD-ROM disk).

Memory 804 and/or storage unit 812 may store computer program code 814, 816 and 818 that includes instructions that are carried out by CPU 802 via memory 804 to assure quality of a software installer. Although FIG. 8 depicts memory 804 as including program code 814, 816 and 818, the present invention contemplates embodiments in which memory 804 does not include all of code 814, 816 and 818 simultaneously, but instead at one time includes only a portion of code 814, a portion of code 816 and/or a portion of code 818.

Further, memory 804 may include other systems not shown in FIG. 8, such as an operating system (e.g., Linux®) that runs on CPU 802 and provides control of various components within and/or connected to computer system 102. Linux is a registered trademark of Linus Torvalds in the United States, other countries, or both.

Storage unit 812 and/or one or more other computer data storage units (not shown) that are coupled to computer system 102 may store configuration file 122 (see FIG. 1), O/S snapshots 124 (see FIG. 1) and database 126. In embodiment, storage unit 812 includes data repository 120 (see FIG. 1).

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable medium(s) (e.g., memory 804 and/or computer data storage unit 812) having computer-readable program code (e.g., program code 814, 816 and 818) embodied or stored thereon.

Any combination of one or more computer-readable mediums (e.g., memory 804 and computer data storage unit 812) may be utilized. The computer-readable medium may be (1) a computer-readable storage medium, or (2) a computer-readable signal medium. As used herein, a computer-readable storage medium is not a computer-readable signal medium.

In one embodiment, the computer-readable storage medium is a physical, tangible computer-readable storage device or physical, tangible computer-readable storage apparatus that stores but does not propagate. A computer-readable storage medium may include, for example, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium is a physical, tangible storage medium that can contain or store a program (e.g., program 814, 816 and 818) for use by or in connection with a system, apparatus, or device for carrying out instructions in the program, and which does not propagate. As used herein, a computer-readable storage medium is not a computer-readable signal medium.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 814, 816 and 818) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 814, 816 and 818) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 8. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2A-2B, FIG. 3A, FIG. 3B, FIG. 4, FIG. 5, FIG. 6, and FIG. 7) and/or block diagrams of methods, apparatus (systems) (e.g., FIG. 1 and FIG. 8), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 814, 816 and 818). These computer program instructions may be provided to one or more hardware processors (e.g., CPU 802) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowcharts and/or block diagram block or blocks.

These computer program instructions may also be stored in a computer-readable medium (e.g., memory 804 or computer data storage unit 812) that can direct a computer (e.g., computer system 102), other programmable data processing apparatus, or other devices to function in a particular manner, such that the instructions (e.g., program 814, 816 and 818) stored in the computer-readable medium produce an article of manufacture including instructions which implement the function/act specified in the flowcharts and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer-implemented process such that the instructions (e.g., program 814, 816 and 818) which are executed on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to assuring quality of a software installer. Thus, an embodiment of the present invention discloses a process for supporting computer infrastructure, where the process includes providing at least one support service for at least one of integrating, hosting, maintaining and deploying computer-readable code (e.g., program code 814, 816 and 818) in a computer system (e.g., computer system 102) including one or more processors (e.g., CPU 802), wherein the processor(s) carry out instructions contained in the code causing the computer system to assure quality of a software installer. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of assuring quality of a software installer.

While it is understood that program code 814, 816 and 818 for assuring quality of a software installer may be deployed by manually loading directly in client, server and proxy computers (not shown) via loading a computer-readable storage medium (e.g., computer data storage unit 812), program code 814, 816 and 818 may also be automatically or semi-automatically deployed into computer system 102 by sending program code 814, 816 and 818 to a central server (e.g., computer system 102) or a group of central servers. Program code 814, 816 and 818 is then downloaded into client computers (not shown) that will execute program code 814, 816 and 818. Alternatively, program code 814, 816 and 818 is sent directly to the client computer via e-mail. Program code 814, 816 and 818 is then either detached to a directory on the client computer or loaded into a directory on the client computer by a button on the e-mail that executes a program that detaches program code 814, 816 and 818 into a directory. Another alternative is to send program code 814, 816 and 818 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 814, 816 and 818 is transmitted to the proxy server and then it is stored on the proxy server.

In one embodiment, program code 814, 816 and 818 is integrated into a client, server and network environment by providing for program code 814, 816 and 818 to coexist with software applications (not shown), operating systems (not shown) and network operating systems software (not shown) and then installing program code 814, 816 and 818 on the clients and servers in the environment where program code 814, 816 and 818 will function.

The first step of the aforementioned integration of code included in program code 814, 816 and 818 is to identify any software on the clients and servers including the network operating system (not shown) where program code 814, 816 and 818 will be deployed that are required by program code 814, 816 and 818 or that work in conjunction with program code 814, 816 and 818. This identified software includes the network operating system that is software that enhances a basic operating system by adding networking features. Next, the software applications and version numbers are identified and compared to the list of software applications and version numbers that have been tested to work with program code 814, 816 and 818. Those software applications that are missing or that do not match the correct version are upgraded with the correct version numbers. Program instructions that pass parameters from program code 814, 816 and 818 to the software applications are checked to ensure the parameter lists match the parameter lists required by the program code 814, 816 and 818. Conversely, parameters passed by the software applications to program code 814, 816 and 818 are checked to ensure the parameters match the parameters required by program code 814, 816 and 818. The client and server operating systems including the network operating systems are identified and compared to the list of operating systems, version numbers and network software that have been tested to work with program code 814, 816 and 818. Those operating systems, version numbers and network software that do not match the list of tested operating systems and version numbers are upgraded on the clients and servers to the required level. After ensuring that the software, where program code 814, 816 and 818 is to be deployed, is at the correct version level that has been tested to work with program code 814, 816 and 818, the integration is completed by installing program code 814, 816 and 818 on the clients and servers.

Another embodiment of the invention provides a method that performs the process steps on a subscription, advertising and/or fee basis. That is, a service provider, such as a Solution Integrator, can offer to create, maintain, support, etc. a process of assuring quality of a software installer. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The flowcharts in FIGS. 2A-2B, FIG. 3A, FIG. 3B, FIG. 4, FIG. 5, FIG. 6, and FIG. 7 and the block diagrams in FIG. 1 and FIG. 8 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 814, 816 or 818), which includes one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing a software installer, the method comprising the steps of:
 a computer recording information representative of a first view of an operating system of the computer;
 the computer executing the software installer to create installed components in an installation of a software application;
 subsequent to the step of executing the software installer to create the installed components in the installation, the computer recording information representative of a second view of the operating system;
 the computer determining and recording a change between the first view and the second view, and based on the change, the computer recording information about the installed components;
 the computer performing checks on the installation;
 based on the checks on the installation, the computer making a determination that the installation was successful;
 responsive to the determination that the installation was successful, the computer removing selected installed components;
 the computer executing the software installer to perform a reinstallation of the selected installed components that had been removed;
 the computer performing checks on the reinstallation;
 subsequent to the step of executing the software installer to perform the reinstallation, the computer recording information representative of a third view of the operating system;
 the computer executing an uninstaller to perform an uninstallation of the software application;
 subsequent to the step of executing the uninstaller, the computer recording information representative of a fourth view of the operating system;
 the computer performing checks on the uninstallation;
 the computer generating a report using the recorded information representative of the first, second, third and fourth views of the operating system;
 responsive to the step of making the determination that the installation was successful, the computer determining a location for an installed shortcut for the software application;
 using the location, the computer extracting executable and command line information inside the shortcut;
 based on the extracted executable and command line information, the computer executing the software application to perform a test of the software application;
 while the software application is executing, the computer sending a close signal to a window of the software application;
 responsive to the step of sending the close signal, the computer reading an exit code from the software application;
 the computer determining whether the exit code matches a standard exit code indicating the test of the software application was successful;
 responsive to a determination the exit code matches the standard exit code indicating the test of the software application was successful, the computer documenting in the report that the test of the software application is successful; or responsive to a determination the exit code does not match the standard exit code, the computer documenting in the report that the test of the software application was unsuccessful; and
 for any other installed shortcut, the computer repeating the steps of determining the location, extracting the executable and command line information, executing the software application; sending the close signal, reading the exit code, determining whether the exit code matches the standard exit code indicating the test was successful, and documenting that the test of the software application was successful or unsuccessful.

2. The method of claim 1, further comprising the step of prior to the step of executing the software installer to create the installed components, the computer reading a configuration file, wherein the step of performing the checks on the installation includes:
 the computer determining an extension of a file name of the software installer is .msi; and
 responsive to the step of determining the extension of the file name of the software installer is .msi:
  the computer determining whether a second exit code returned from the installation matches a second standard exit code indicating the installation was successful based on the extension being .msi;
  the computer determining whether an event view of the operating system includes a product name identifying the software application;
  the computer determining whether a signature file in the configuration file is included in the recorded information about the installed components; and
 responsive to a determination that the second exit code matches the second standard exit code, the event view includes the product name, and the signature file is included in the recorded information about the installed components, the computer determining the installation was successful; or responsive to a determination that the second exit code does not match the second standard exit code, the event view does not include the product name or the signature file is not included in the recorded information about the installed components, the computer determining the installation was unsuccessful.

3. The method of claim 1, wherein the step of performing the checks on the installation includes:
 the computer determining an extension of a file name of the software installer is .exe; and
 responsive to the step of determining the extension of the file name of the software installer is .exe:
  the computer determining whether a second exit code returned from the installation matches a second standard exit code indicating the installation was successful based on the extension being .exe;
  the computer extracting a product name identifying the software application from a script or a source code providing the installation;
  the computer determining whether the extracted product name matches a product name in an uninstall registry key; and
 responsive to a determination that the second exit code matches the second standard exit code and the extracted product name matches the product name in the uninstall registry key, the computer determining the installation was successful; or responsive to a determination that the second exit code does not match the second standard exit code and the extracted product name does not match the product name in the uninstall registry key, the computer determining the installation was unsuccessful.

4. The method of claim 1, further comprising the steps of:
based on checks on another installation of the software application, the computer determining the other installation was unsuccessful by the computer determining a second exit code returned from the other installation does not match the standard exit code;
the computer determining the second exit code indicates an existence of an automated recovery from the other installation that was unsuccessful;
the computer opening a file of the software installer for write operations;
the computer modifying tables in the file to perform the automated recovery;
the computer closing the file; and
the computer designating the automated recovery as successful.

5. The method of claim 1, further comprising the steps of:
based on checks on another installation of the software application, the computer determining the other installation was unsuccessful by determining a signature file in a configuration file is included in the recorded information about the installed components, determining a product name extracted from a script of a source code providing the other installation does not match the product name in an uninstall registry key, or determining a second exit code indicates a test of closing a window of the software application is unsuccessful, the test using executable and command line information extracted from an installed shortcut of the software application;
the computer opening a file of the software installer for write operations;
the computer modifying tables in the file to perform an automated recovery from the installation that was unsuccessful;
the computer closing the file; and
the computer designating the automated recovery as successful.

6. The method of claim 1, wherein the step of performing the checks on the reinstallation includes:
the computer determining a second exit code returned from the reinstallation matches a second standard exit code indicating the reinstallation was successful;
the computer determining the selected installed components that had been removed were subsequently restored in the reinstallation;
the computer searching for and locating one or more messages in an event viewer of the operating system, the one or more messages including a product name of the software installer; and
the computer adding to the report information about the second exit code matching the second standard exit code indicating the reinstallation was successful, the selected installed components being restored, and the one or more messages including the product name of the software installer.

7. The method of claim 1, wherein the step of performing the checks on the uninstallation includes:
the computer determining an extension of a file name of the software installer is .msi; and
responsive to the step of determining the extension of the file name of the software installer is .msi:
the computer determining a second exit code returned from the uninstallation matches a second standard exit code indicating the uninstallation was successful;
the computer determining a product code for the installed components does not exist in the fourth view of the operating system;
the computer determining an event view of the operating system does not include a product name identifying the software application; and
the computer determining a signature file in a configuration file is not included in the fourth view of the operating system.

8. The method of claim 1, wherein the step of performing the checks on the uninstallation includes:
the computer determining an extension of a file name of the software installer is .exe; and
responsive to the step of determining the extension of the file name of the software installer is .exe:
the computer determining a second exit code returned from the uninstallation matches a second standard exit code indicating the uninstallation was successful;
the computer extracting a product name identifying the software application from a script or a source code providing the installation;
the computer determining the extracted product name does not exist in an uninstall registry key; and
the computer determining a signature file in a configuration file is not included in the fourth view of the operating system.

9. A computer system comprising:
a central processing unit (CPU);
a memory coupled to the CPU;
a computer-readable, tangible storage device coupled to the CPU, the storage device containing instructions that are executed by the CPU via the memory to implement a method of managing a software installer, the method comprising the steps of:
the computer system recording information representative of a first view of an operating system of the computer system;
the computer system executing the software installer to create installed components in an installation of a software application;
subsequent to the step of executing the software installer to create the installed components in the installation, the computer system recording information representative of a second view of the operating system;
the computer system determining and recording a change between the first view and the second view, and based on the change, the computer system recording information about the installed components;
the computer system performing checks on the installation;
based on the checks on the installation, the computer system making a determination that the installation was successful;
responsive to the determination that the installation was successful, the computer system removing selected installed components;
the computer system executing the software installer to perform a reinstallation of the selected installed components that had been removed;
the computer system performing checks on the reinstallation;
subsequent to the step of executing the software installer to perform the reinstallation, the computer system recording information representative of a third view of the operating system;
the computer system executing an uninstaller to perform an uninstallation of the software application;

subsequent to the step of executing the uninstaller, the computer system recording information representative of a fourth view of the operating system;

the computer system performing checks on the uninstallation;

the computer system generating a report using the recorded information representative of the first, second, third and fourth views of the operating system;

responsive to the step of making the determination that the installation was successful, the computer system determining a location for an installed shortcut for the software application;

using the location, the computer system extracting executable and command line information inside the shortcut;

based on the extracted executable and command line information, the computer system executing the software application to perform a test of the software application;

while the software application is executing, the computer system sending a close signal to a window of the software application;

responsive to the step of sending the close signal, the computer system reading an exit code from the software application;

the computer system determining whether the exit code matches a standard exit code indicating the test of the software application was successful;

responsive to a determination the exit code matches the standard exit code indicating the test of the software application was successful, the computer system documenting in the report that the test of the software application is successful; or responsive to a determination the exit code does not match the standard exit code, the computer system documenting in the report that the test of the software application was unsuccessful; and for any other installed shortcut, the computer system repeating the steps of determining the location, extracting the executable and command line information, executing the software application; sending the close signal, reading the exit code, determining whether the exit code matches the standard exit code indicating the test was successful, and documenting that the test of the software application was successful or unsuccessful.

10. The computer system of claim 9, wherein the method further comprises the step of prior to the step of executing the software installer to create the installed components, the computer system reading a configuration file, wherein the step of performing the checks on the installation includes:

the computer system determining an extension of a file name of the software installer is .msi; and responsive to the step of determining the extension of the file name of the software installer is .msi:

the computer system determining whether a second exit code returned from the installation matches a second standard exit code indicating the installation was successful based on the extension being .msi;

the computer system determining whether an event view of the operating system includes a product name identifying the software application;

the computer system determining whether a signature file in the configuration file is included in the recorded information about the installed components; and responsive to a determination that the second exit code matches the second standard exit code, the event view includes the product name, and the signature file is included in the recorded information about the installed components, the computer system determining the installation was successful; or responsive to a determination that the second exit code does not match the second standard exit code, the event view does not include the product name or the signature file is not included in the recorded information about the installed components, the computer system determining the installation was unsuccessful.

11. The computer system of claim 9, wherein the step of performing the checks on the installation includes:

the computer system determining an extension of a file name of the software installer is .exe; and responsive to the step of determining the extension of the file name of the software installer is .exe:

the computer system determining whether a second exit code returned from the installation matches a second standard exit code indicating the installation was successful based on the extension being .exe;

the computer system extracting a product name identifying the software application from a script or a source code providing the installation;

the computer system determining whether the extracted product name matches a product name in an uninstall registry key; and responsive to a determination that the second exit code matches the second standard exit code and the extracted product name matches the product name in the uninstall registry key, the computer system determining the installation was successful; or responsive to a determination that the second exit code does not match the second standard exit code and the extracted product name does not match the product name in the uninstall registry key, the computer system determining the installation was unsuccessful.

12. A computer program product, comprising:

a computer-readable, tangible storage device; and a computer-readable program code stored in the computer-readable, tangible storage device, the computer-readable program code containing instructions that are executed by a central processing unit (CPU) of a computer system to implement a method of managing a software installer, the method comprising the steps of:

the computer system recording information representative of a first view of an operating system of the computer system;

the computer system executing the software installer to create installed components in an installation of a software application;

subsequent to the step of executing the software installer to create the installed components in the installation, the computer system recording information representative of a second view of the operating system;

the computer system determining and recording a change between the first view and the second view, and based on the change, the computer system recording information about the installed components;

the computer system performing checks on the installation;

based on the checks on the installation, the computer system making a determination that the installation was successful;

responsive to the determination that the installation was successful, the computer system removing selected installed components;

the computer system executing the software installer to perform a reinstallation of the selected installed components that had been removed;

the computer system performing checks on the reinstallation;

subsequent to the step of executing the software installer to perform the reinstallation, the computer system recording information representative of a third view of the operating system;

the computer system executing an uninstaller to perform an uninstallation of the software application;

subsequent to the step of executing the uninstaller, the computer system recording information representative of a fourth view of the operating system;

the computer system performing checks on the uninstallation;

the computer system generating a report using the recorded information representative of the first, second, third and fourth views of the operating system;

responsive to the step of making the determination that the installation was successful, the computer system determining a location for an installed shortcut for the software application;

using the location, the computer system extracting executable and command line information inside the shortcut;

based on the extracted executable and command line information, the computer system executing the software application to perform a test of the software application;

while the software application is executing, the computer system sending a close signal to a window of the software application;

responsive to the step of sending the close signal, the computer system reading an exit code from the software application;

the computer system determining whether the exit code matches a standard exit code indicating the test of the software application was successful;

responsive to a determination the exit code matches the standard exit code indicating the test of the software application was successful, the computer system documenting in the report that the test of the software application is successful; or responsive to a determination the exit code does not match the standard exit code, the computer system documenting in the report that the test of the software application was unsuccessful; and for any other installed shortcut, the computer system repeating the steps of determining the location, extracting the executable and command line information, executing the software application; sending the close signal, reading the exit code, determining whether the exit code matches the standard exit code indicating the test was successful, and documenting that the test of the software application was successful or unsuccessful.

13. The program product of claim 12, wherein the method further comprises the step of prior to the step of executing the software installer to create the installed components, the computer system reading a configuration file, wherein the step of performing the checks on the installation includes:

the computer system determining an extension of a file name of the software installer is .msi; and responsive to the step of determining the extension of the file name of the software installer is .msi:

the computer system determining whether a second exit code returned from the installation matches a second standard exit code indicating the installation was successful based on the extension being .msi;

the computer system determining whether an event view of the operating system includes a product name identifying the software application;

the computer system determining whether a signature file in the configuration file is included in the recorded information about the installed components; and responsive to a determination that the second exit code matches the second standard exit code, the event view includes the product name, and the signature file is included in the recorded information about the installed components, the computer system determining the installation was successful; or responsive to a determination that the second exit code does not match the second standard exit code, the event view does not include the product name or the signature file is not included in the recorded information about the installed components, the computer system determining the installation was unsuccessful.

14. The program product of claim 12, wherein the step of performing the checks on the installation includes:

the computer system determining an extension of a file name of the software installer is .exe; and responsive to the step of determining the extension of the file name of the software installer is .exe:

the computer system determining whether a second exit code returned from the installation matches a second standard exit code indicating the installation was successful based on the extension being .exe;

the computer system extracting a product name identifying the software application from a script or a source code providing the installation;

the computer system determining whether the extracted product name matches a product name in an uninstall registry key; and responsive to a determination that the second exit code matches the second standard exit code and the extracted product name matches the product name in the uninstall registry key, the computer system determining the installation was successful; or responsive to a determination that the second exit code does not match the second standard exit code and the extracted product name does not match the product name in the uninstall registry key, the computer system determining the installation was unsuccessful.

15. A process for supporting computing infrastructure, the process comprising the step of:

a first computer system providing at least one support service for at least one of creating, integrating, hosting, maintaining, and deploying computer-readable code in a second computer system, the computer-readable code containing instructions, wherein the instructions, when carried out by a processor of the second computer system, implement a method of managing a data package, the method comprising the steps of:

the second computer system recording information representative of a first view of an operating system of the second computer system;

the second computer system executing the software installer to create installed components in an installation of a software application;

subsequent to the step of executing the software installer to create the installed components in the installation, the second computer system recording information representative of a second view of the operating system;

the second computer system determining and recording a change between the first view and the second view, and based on the change, the second computer system recording information about the installed components;

the second computer system performing checks on the installation;

based on the checks on the installation, the computer system making a determination that the installation was successful;

responsive to the determination that the installation was successful, the second computer system removing selected installed components;

the second computer system executing the software installer to perform a reinstallation of the selected installed components that had been removed;

the second computer system performing checks on the reinstallation;

subsequent to the step of executing the software installer to perform the reinstallation, the second computer system recording information representative of a third view of the operating system;

the second computer system executing an uninstaller to perform an uninstallation of the software application;

subsequent to the step of executing the uninstaller, the second computer system recording information representative of a fourth view of the operating system;

the second computer system performing checks on the uninstallation;

the second computer system generating a report using the recorded information representative of the first, second, third and fourth views of the operating system;

responsive to the step of making the determination that the installation was successful, the second computer system determining a location for an installed shortcut for the software application;

using the location, the second computer system extracting executable and command line information inside the shortcut;

based on the extracted executable and command line information, the second computer system executing the software application to perform a test of the software application;

while the software application is executing, the second computer system sending a close signal to a window of the software application;

responsive to the step of sending the close signal, the second computer system reading an exit code from the software application;

the second computer system determining whether the exit code matches a standard exit code indicating the test of the software application was successful;

responsive to a determination the exit code matches the standard exit code indicating the test of the software application was successful, the second computer system documenting in the report that the test of the software application is successful; or responsive to a determination the exit code does not match the standard exit code, the second computer system documenting in the report that the test of the software application was unsuccessful; and for any other installed shortcut, the second computer system repeating the steps of determining the location, extracting the executable and command line information, executing the software application; sending the close signal, reading the exit code, determining whether the exit code matches the standard exit code indicating the test was successful, and documenting that the test of the software application was successful or unsuccessful.

16. The process of claim 15, wherein the method further comprises the step of prior to the step of executing the software installer to create the installed components, the second computer system reading a configuration file, wherein the step of performing the checks on the installation includes:

the second computer system determining an extension of a file name of the software installer is .msi; and responsive to the step of determining the extension of the file name of the software installer is .msi:

the second computer system determining whether a second exit code returned from the installation matches a second standard exit code indicating the installation was successful based on the extension being .msi;

the second computer system determining whether an event view of the operating system includes a product name identifying the software application;

the second computer system determining whether a signature file in the configuration file is included in the recorded information about the installed components; and responsive to a determination that the second exit code matches the second standard exit code, the event view includes the product name, and the signature file is included in the recorded information about the installed components, the second computer system determining the installation was successful; or responsive to a determination that the second exit code does not match the second standard exit code, the event view does not include the product name or the signature file is not included in the recorded information about the installed components, the second computer system determining the installation was unsuccessful.

17. The process of claim 15, wherein the step of performing the checks on the installation includes:

the second computer system determining an extension of a file name of the software installer is .exe; and responsive to the step of determining the extension of the file name of the software installer is .exe:

the second computer system determining whether a second exit code returned from the installation matches a second standard exit code indicating the installation was successful based on the extension being .exe;

the second computer system extracting a product name identifying the software application from a script or a source code providing the installation;

the second computer system determining whether the extracted product name matches a product name in an uninstall registry key; and responsive to a determination that the second exit code matches the second standard exit code and the extracted product name matches the product name in the uninstall registry key, the second computer system determining the installation was successful; or responsive to a determination that the second exit code does not match the second standard exit code and the extracted product name does not match the product name in the uninstall registry key, the second computer system determining the installation was unsuccessful.

* * * * *